United States Patent [19]
Suzuki et al.

[11] Patent Number: 5,508,847
[45] Date of Patent: Apr. 16, 1996

[54] TELEPHOTO ZOOM LENS FOR 35 MM PHOTOS

[75] Inventors: Kenzaburo Suzuki, Tokyo; Masahiro Nakatsuji, Kawasaki, both of Japan

[73] Assignee: Nikon Corporation, Tokyo, Japan

[21] Appl. No.: 207,724

[22] Filed: Mar. 9, 1994

Related U.S. Application Data

[63] Continuation-in-part of Ser. No. 014,517, Feb. 8, 1993, abandoned.

[30] Foreign Application Priority Data

Feb. 13, 1992 [JP] Japan .................................. 4-25591
Jul. 23, 1993 [JP] Japan .................................. 5-202785

[51] Int. Cl.⁶ .................................................. G02B 15/14
[52] U.S. Cl. .......................... 359/683; 359/765; 359/763; 359/714
[58] Field of Search ................................... 359/671, 687, 359/688, 714, 763, 764, 765, 683

[56] References Cited

U.S. PATENT DOCUMENTS 4,550,987  11/1985  Tachihara .............................. 359/764

*Primary Examiner*—David C. Nelms
*Assistant Examiner*—Vu A. Le
*Attorney, Agent, or Firm*—Shapiro and Shapiro

[57] ABSTRACT

A telephoto zoom lens, sequentially from an object, comprising: a first lens group having positive refracting power; a second lens group having negative refracting power; a third lens group having negative refracting power; a fourth lens group having positive refracting power; and a fifth lens group having negative refracting power. During variable power from a wide-angle end to a telephoto end, the lens groups move so that a space dimension between the first and second lens groups increases, a space dimension between the second and third lens groups changes linearly or non-linearly, and a space dimension between the fourth and fifth lens groups decreases. The zoom lens satisfies various conditions.

71 Claims, 9 Drawing Sheets

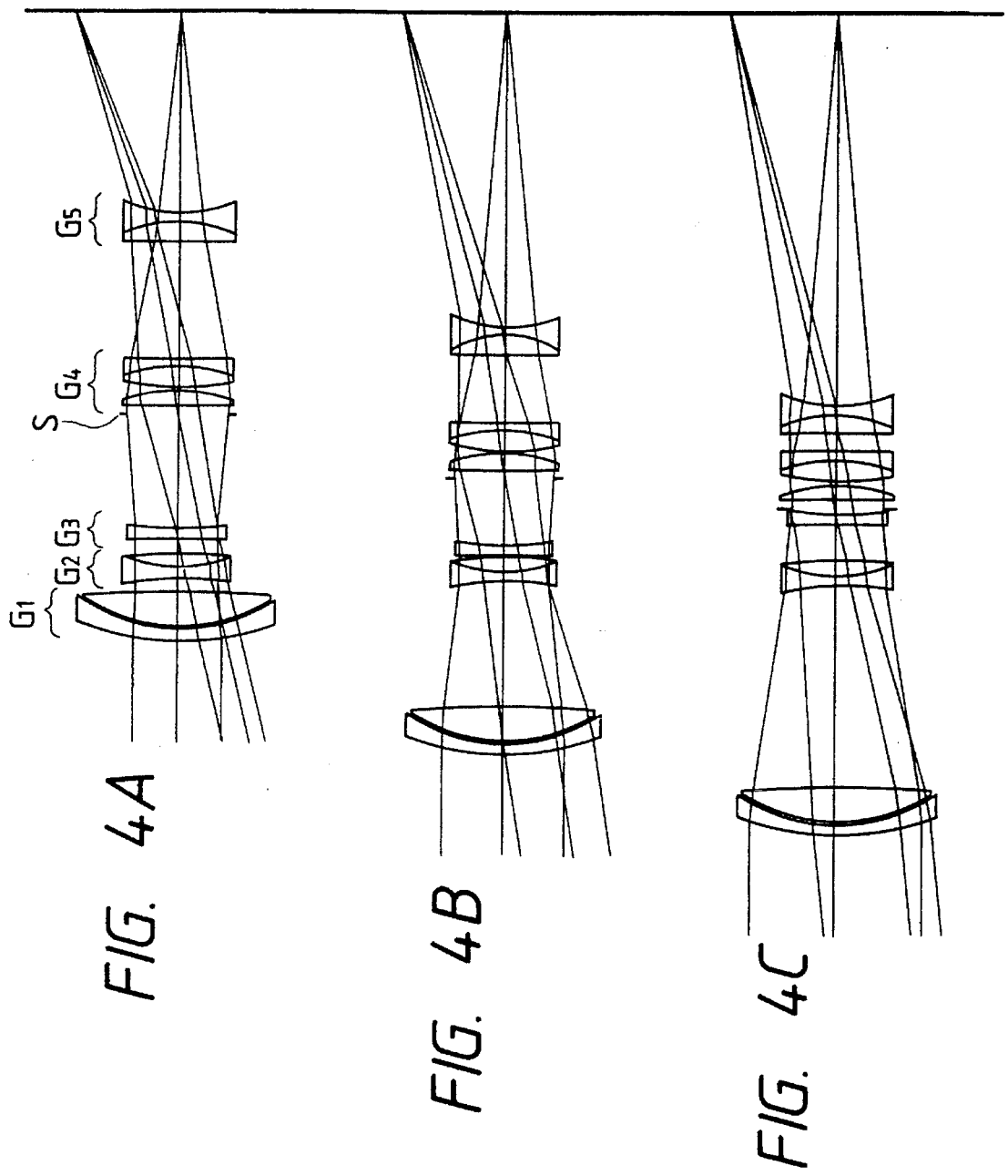

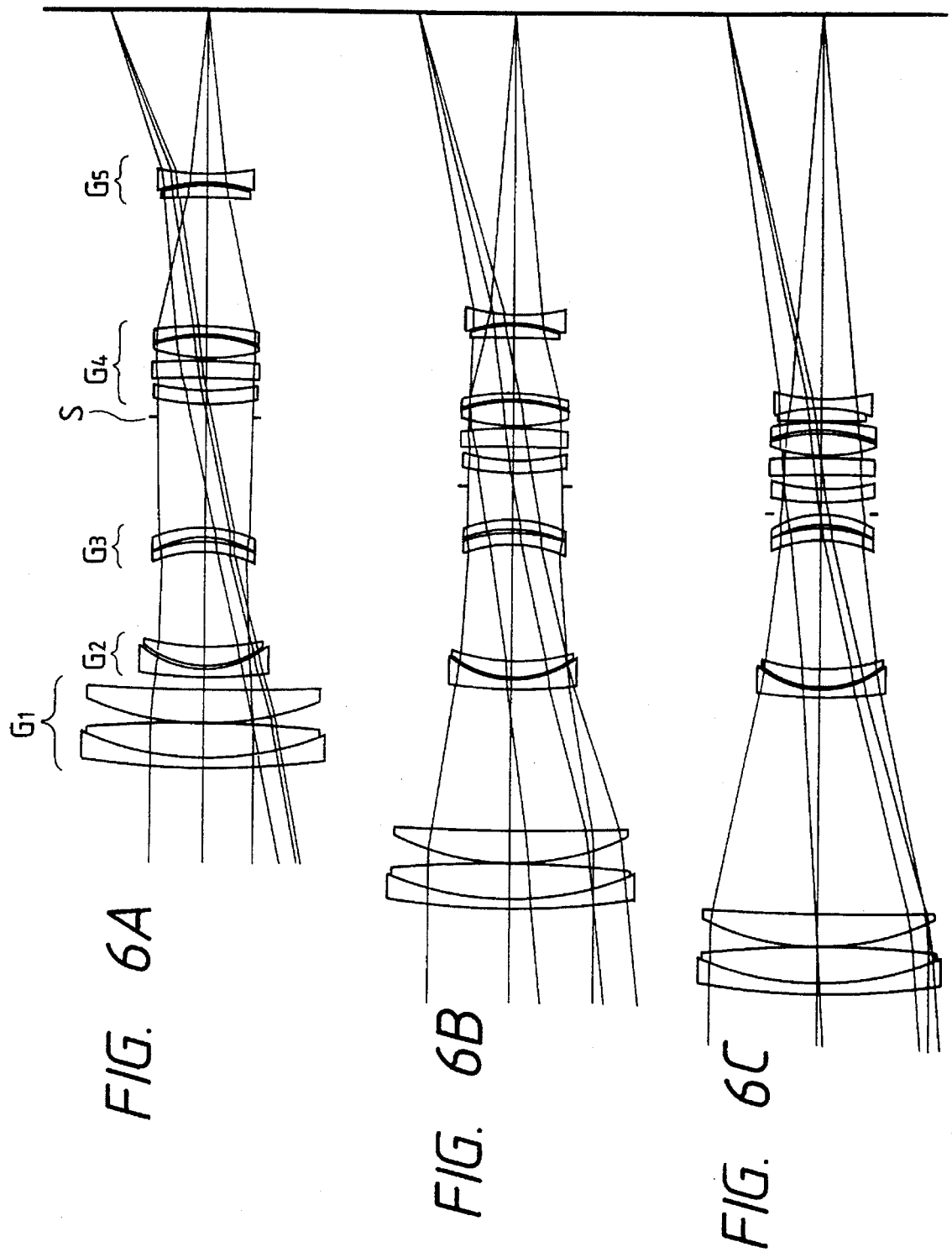

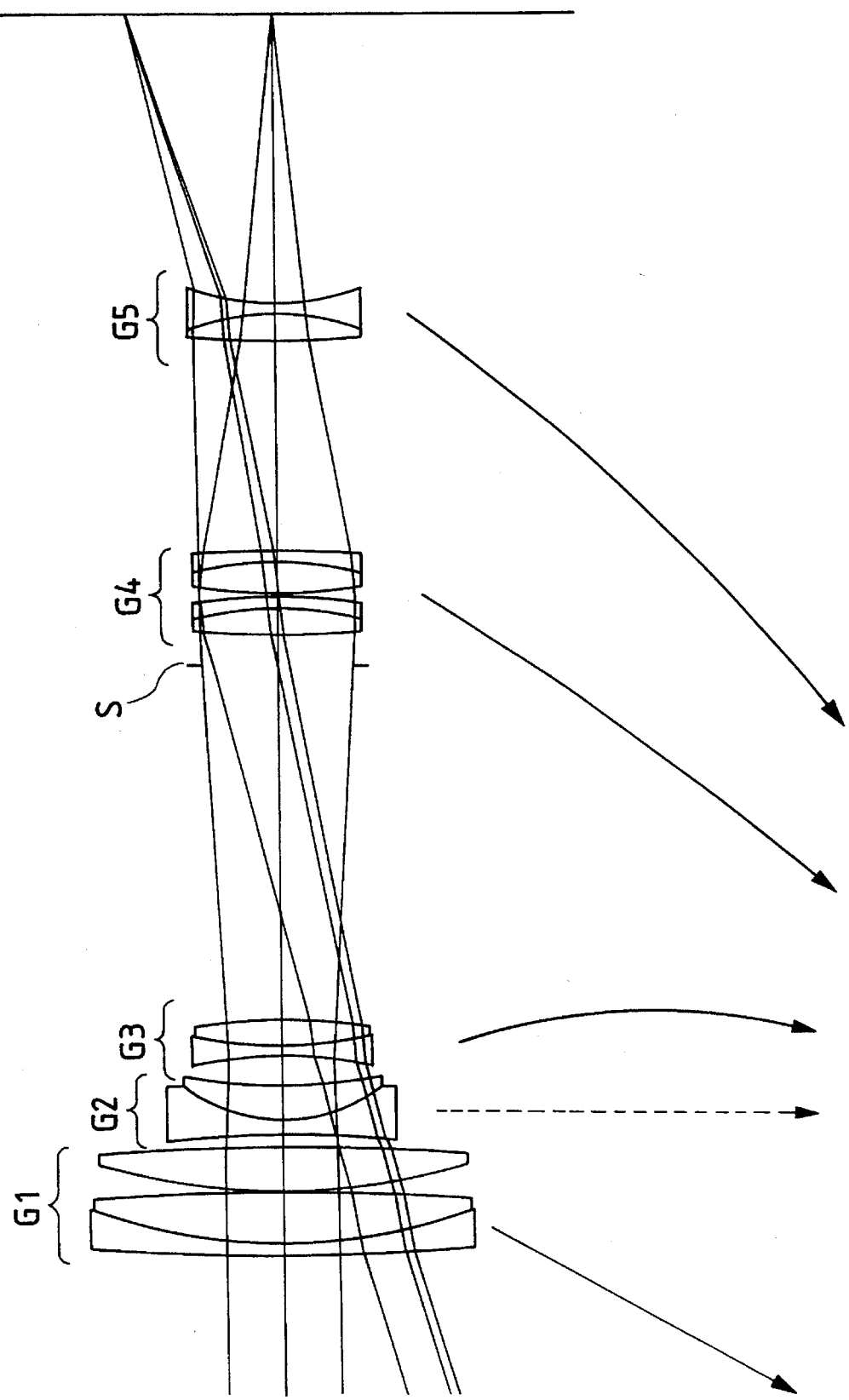

TELEPHOTO ZOOM LENS FOR 35 MM PHOTOS

This application is a continuation-in-part of application Ser. No. 08/014,517 filed Feb. 8, 1993, now abandoned.

BACKGROUND OF THE INVENTION

1. Field of the Invention

The present invention relates to a telephoto zoom lens for 35 mm photos.

2. Related Background Art

In recent years, a large variety of zoom types have been proposed with an enhanced performance of a zoom lens. A 4-group afocal type or the like has hitherto been employed in the sector of a so-called telephoto area. An image-forming performance is stable, however, both an entire length and a lens diameter are large. This conduces to increments both in dimension and weight, which is in turn disadvantageous in terms of portability and operability.

Further, a zoom type based on movements of 3 or more groups of lenses has been proposed with a technological sophistication of a lens barrel in recent years. It was, however, quite difficult to attain a wider angle, a higher zoom ratio, a more miniaturized size and a more excellent image-forming performance with no contradiction.

SUMMARY OF THE INVENTION (A) First Invention

Accordingly, it is a primary object of the present invention, which obviates the defects inherent in the conventional telephoto zoom lens described above, to provide a zoom lens having a relatively small entire length of lenses and an excellent image-forming performance and, especially, a zoom lens in a telephoto area for 35mm photos.

To accomplish this object, according to one aspect of the present invention, there is provided a telephoto zoom lens, sequentially from an object as shown in a schematic diagram of FIG. 1, comprising: a first lens Group $G_1$ having positive refracting power; a second lens Group $G_2$ having 10 negative refracting power; a third lens Group $G_3$ having negative refracting power; a fourth lens Group $G_4$ having positive refracting power; and a fifth lens Group $G_5$ having negative refracting power. During variable power from a wide-angle end to a telephoto end, the lens Groups move so that a space dimension between the first and second lens Groups increases, a space dimension between the second and third lens Groups changes linearly or nonlinearly, and a space dimension between the fourth and fifth lens Groups decreases.

Further, the telephoto zoom lens may be constructed preferably to satisfy the following conditions:

$$0.3 < f_1/(fW \cdot fT)^{1/2} < 1.5 \quad (1)$$

$$0.3 < f_2/f_2 < 5 \quad (2)$$

$$0.01 < (DT_{2-3} - DW_{2-3})/fW < 0.6 \quad (b\ 3)$$

where $f_1$ is the focal distance of the first lens group, $f_2$ is the focal distance of the second lens group, $f_3$ is the focal distance of the third lens group, $f_4$ is the focal distance of the fourth lens group, $f_5$ is the focal distance of the fifth lens group, fW is the focal distance of the whole zoom lens at the wide-angle end, $DW_{2-3}$ is the space dimension between the second third lens groups at the wide-angle end, fT is the focal distance of the whole zoom lens at the telephoto end, and $DT_{2-3}$ is the space dimension between the second and third lens groups at the telephoto end.

Herein, the characteristics of a multi-group zoom lens including a multiplicity of lens groups will be explained as a general theory. In the following discussion, however, the term "multi-group" implies a zoom lens constructed of 3 or more groups of lenses because of requiring at least two movable groups of lenses to constitute a typical zoom lens.

Firstly, the multi-group zoom lens has an increased number of groups for governing variable power and is therefore contrived to obtain a higher magnification. Burdening of respective groups is easily made uniform, and hence the superlative image-forming performance can be attained. Further, although there exists such a problem that a structure of the lens barrel becomes complicated due to an increment in the number of movable elements. This problem is, however, on the verge of being overcome by an advancement of technology of the lens barrel in recent years. For instance, a variety of 3- or 4-group telephoto zoom lenses have been proposed. There remain, however, a difficulty to provide compactness and increase the magnification and a problem relative to fluctuations in aberration during variable power by zooming.

Secondly, an explanation will deal with a so-called telephoto type lens constructed of, sequentially from an object, a positive lens group and a negative lens group. The positive and negative lens groups are so arranged as to be spaced away from each other. It is therefore possible to reduce a length from the positive lens group to an image surface as compared with a focal distance of a synthetic system. Hence, the telephoto type lens is widely employed as a telephoto lens for photos, etc. in terms of an advantage to make the total length reducible.

Thirdly, a conventional telephoto zoom lens of a 4-group afocal type or the like will be discussed. In, e.g., the 4-group afocal type, a geometry of lens groups having positive/negative/positive/positive refracting power will be considered. Thus, the structure is such that the refracting power of the second negative lens group is relatively large, and the entire length at a wide-angle end is large because of an invariable total length configuration. There is a limit to make the lens compact. Besides, the group for governing the variable power is only the second lens group. This restricts an increase in magnification and compensation of aberration.

The present invention is devised based on the first through third technical bases and backgrounds stated above. To be specific, a zoom lens according to the present invention attains a reduction in overall length with an image side part constructed as a positive/negative telephoto type lens. The zoom lens adopts, sequentially from an object, a positive/negative/negative/positive/negative 5-group geometry on the whole with an object side part constructed based on a positive/negative/negative 3-group geometry.

The zoom lens according to the present invention involves the use of the foregoing multi-group geometry including the telephoto type lens elements on the image side. Therefore, it is feasible to attain the telephoto zoom lens capable of exhibiting, though compact, an excellent image-forming performance and being applied to an enhancement of magnification.

Hence, the overall length can be reduced particularly-at the wide-angle end because of the positive/negative/negative/positive/negative multi-group geometry. Further, there is provided a great degree of freedom for the compensation of aberration including a degree of freedom of how the lens groups move owing to an increment in the number of lens groups. The superlative image-forming performance can be therefore obtained even with a high magnification. Especially as in the present invention, there is provided the zoom lens of such a type that the total length is small at the wide-angle end but extended during variable power by zooming to the telephoto end. The zoom lens is capable of reducing the total length at the wide,angle end and a weight of the whole zoom lens to a greater degree than in the conventional telephoto zoom lens of the 4-group afocal type.

Further, a height of beam passing through each lens groups at the wide-angle end is decreased. Reduced also is a probability in which the aberration occurs in each lens group. This is advantageous in terms of compensating the aberration on the wide-angle side.

The following is an explanation of the respective conditional expressions (1)–(3) according to the present invention.

The conditional expression (1) prescribes an adequate range with respect to a focal distance fW at the wide-angle end of the zoom lens, a focal distance fT at the telephoto end and a focal distance $f_1$ of a first lens group $G_1$. If over an upper limit of the conditional expression (1), the entire length at the telephoto end becomes large enough to be contradictory to the compactness. Besides, this unpreferably induces a deficiency in quantity of peripheral light at the telephoto end and increases in diameters of front lens elements.

Note that the present invention is capable of exhibiting more effects by setting the upper limit to 1.0 or under.

Whereas if under a lower limit of the conditional expression (1), the focal distance $f_1$ of the first lens group $G_1$ becomes too small. A spherical aberration at the telephoto end tends to be compensated with deficiency. Fluctuations in curvature of field during the variable power by zooming become tremendous. Further, there is excessively increases a magnitude of an image-forming magnification at the telephoto end by the lens system subsequent to the second lens group $G_2$. An axial chromatic aberration caused in the first lens group $G_1$ spreads, with the result that no high image-forming performance can be obtained.

Note that the lower limit is set preferably to 0.6 or less for obtaining a much higher image-forming performance.

The conditional expression (2) gives a condition to prescribe an adequate ratio with respect to the focal distance $f_2$ of the second lens group $G_2$ and the focal distance $f_3$ of the third lens group $G_3$.

If over an upper limit of the conditional expression (2), the focal distance $f_1$ of the third lens group $G_3$ becomes too small. Fluctuations in comatic aberration during the variable power by zooming augment. A distortion at the telephoto end shifts largely toward a negative side. Further, a positive lower coma occurs at the wide-angle end, and the spherical aberration at the telephoto end is apt to be excessively compensated on a positive side. Consequently, the high image-forming performance is not obtained.

Note that the much higher image-forming performance is obtained by setting the upper limit to 3 or under.

Whereas if under a lower limit of the conditional expression (2), the focal distance $f_2$ of the second lens group $G_2$ becomes too small. The fluctuations in the comatic aberration during the variable power by zooming augment. The distortion at the telephoto end shifts largely toward the positive side. Besides, a negative lower comma occurs at the wide-angle end, and the spherical aberration at the telephoto end is apt to be excessively compensated. Consequently, the high image-forming performance is not obtained.

The conditional expression (3) prescribes an adequate ratio with respect to a difference in space dimension at the wide-angle end and telephoto end between the second and third lens groups $G_2$, $G_3$ of the zoom lens and the focal distance fW as well.

If over an upper limit of the conditional expression (1), the entire length at the telephoto end excessively 10 increases. This induces not only increments in diameters of the front lens elements but also a large shift of the curvature of field toward the negative side both at the wide-angle end and at the telephoto end. Besides, the spherical aberration at the telephoto end is unpreferably compensated with deficiency.

Note that the upper limit is set preferably to 0.3 or under.

Whereas if under a lower limit of the conditional expression (3), it is impossible to take a large variation in using magnification of the third lens group $G_3$. It is therefore difficult to make uniform burdening of aberration of each lens group during the variable power by zooming and increasing the magnification. Moreover, the fluctuations in various aberrations during the variable power by zooming augment. Especially, the fluctuations in the comatic aberration as well as in the curvature of field become large. The curvature of field becomes excessive on the negative side both at the wide-angle end and at the telephoto end. In addition to this, the positive lower coma is caused at the wide-angle end, and unpreferably the spherical aberration is excessively compensated at the telephoto end.

Furthermore, for attaining the high image-forming performance by overcoming the fluctuations in aberrations, relative positional relationships between the respective lens groups are of importance in a focal distance state other than both ends during the variable power by zooming, i.e., in a so-called intermediate focal distance state. Herein, a moving trajectory of the third lens group $G_3$ during the variable power by zooming will be discussed.

Contemplated is a beam of light L emitted via an axial object point from the second lens group $G_2$ in the intermediate focal distance state when the third lens group $G_3$ takes a nonlinear convex trajectory on the object side. The light L has the following properties. To start with, where the light L diverges, the spherical aberration can be shifted to the negative side. Where the light L converges, the spherical aberration and the curvature of field can be shifted to the positive side. Contrastingly, when the third lens group $G_3$ takes a nonlinear concave trajectory on the object side, the light L has the following properties. To begin with, where the light L diverges, the spherical aberration can be shifted to the positive side. Where the light L converges, the spherical aberration and the curvature of field can be shifted to the negative side.

Further, if the light L is substantially parallel to the optical axis, the spherical aberration becomes substantially uniform without depending on the position of the third lens group $G_3$. However, the curvature of field is, when the third lens group $G_3$ moves toward the object, shifted to the positive side. The curvature of field is, when the third lens group $G_3$ moves toward the image, shifted to the negative side. If such properties are utilized, it is feasible to eliminate the fluctuations in the aberrations that can not be compensated up by the lens groups other than the third lens group $G_3$. This is obvious from the embodiments that will be discussed below.

However, when providing a sufficient degree of freedom of the compensation of aberration by the lens groups other than the second and third lens group $G_2$, $G_3$, the high image-forming performance is obtainable even with the linear trajectory.

Accordingly, for acquiring the still higher performance, preferably the following conditions in addition to those given above are satisfied:

$$0.5 < |f_{2-3}/fW| < 1 \qquad (4)$$

$$0.6 < f_4/|f_5| < 1.2 \qquad (5)$$

$$0.55 < f_1/|f_2| < 1 \qquad (6)$$

$$0.8 < |f_3|/fW < 2 \qquad (7)$$

where $f_1$: the focal distance of the first lens group $G_1$, $f_2$: the focal distance of the second lens group $G_2$, $f_3$: the focal distance of the third lens group $G_3$, $f_{2-3}$: the synthetic focal distance of the second and third lens groups $G_2$, $G_3$ at the wide-angle end, $f_4$: the focal distance of the fourth lens group $G_4$, $f_5$: the focal distance of the fifth lens group $G_5$, and, fW: the focal distance of the whole zoom lens at the wide-angle end.

An explanation of the respective conditional expressions (4)–(7) will hereafter be given.

The conditional expression (4) prescribes an adequate ratio with respect to the synthetic focal distance $f_{2-3}$ of the second and third lens groups $G_2$, $G_3$ at the wide-angle end and the focal distance fW of the whole zoom lens at the wide-angle end.

If over an upper limit of the conditional expression (4), there are increased the fluctuations in the comatic aberration during the variable power by zooming, in the curvature of filed and in astigmatism. It is assumed that the lens groups subsequent to, e.g., the fourth lens group $G_4$ have the same construction. In this case, a sufficient back-focal distance at the wide-angle end is hard to ensure. Whereas if under a lower limit of the conditional expression (4), and when the lens groups subsequent, e.g., the fourth lens group $G_4$ are the same, the total length at the wide-angle end is large. This causes not only an inconvenience but also an increase in the diameter of the lenses subsequent to the fourth lens group $G_4$. This is contrary to the compactness.

The conditional expression (5) prescribes a proper ratio with respect to magnitudes of the focal distance $f_4$ of the fourth lens group G and the focal distance $f_5$ of the fifth lens group $G_5$.

If in excess of an upper limit of the conditional expression (5), the focal distance of the fifth lens group $G_5$ becomes too small, and the astigmatism at the wide-angle end augments. The distortions both at the wide-angle end and at the telephoto end shift largely in the positive direction. Petzval's sum deviates toward the negative side. A good aberration balance can not be kept during the variable power by zooming. Whereas if under a lower limit of the conditional expression (5), the focal distance of the fourth lens group $G_4$ becomes too small. During the variable power by zooming, the spherical aberration and the comatic aberration increase over the entire area. Further, if the fifth lens group $G_5$ is the same, the sufficient back-focal distance is hard to ensure.

The conditional expression (6) prescribes an adequate ratio with respect to the focal distance $f_1$ of the first lens group $G_1$ and the focal distance $f_2$ of the second lens group $G_2$.

If over an upper limit of the conditional expression (6), the focal distance of the second lens group $G_2$ becomes too small. If the lens groups subsequent to, e.g., the third lens group $G_3$ have the same construction, the overall length at the wide-angle end is large. The lower coma at the wide-angle end becomes excessive. The Petzval's sum disadvantageously deviates toward the negative side. Whereas if under a lower limit of the conditional expression (6), the focal distance of the second lens group $G_2$ becomes too large. If the lens groups subsequent to the third lens group $G_3$ have the same construction, it is difficult to ensure the sufficient back-focal distance at the wide-angle end. The fluctuations in the curvature of field during zooming disadvantageously increase.

The conditional expression (7) prescribes a proper ratio with respect to a magnitude of the focal distance $f_3$ of the third lens group $G_3$ and the focal distance fW at the wide-angle end.

If in excess of an upper limit of the conditional expression (7), the focal distance of the third lens group $G_3$ becomes too large. When the lens groups subsequent to the fourth lens group $G_4$ have the same construction, the sufficient back-focal distance at the wide-angle end is hard to ensure. Further, the fluctuations both in the curvature of field during the variable power by zooming and in the comatic aberration disadvantageously excessively augment. Whereas if under a lower limit of the conditional expression (7), the focal distance of the third lens group $G_3$ becomes too small. When the lens groups subsequent to, e.g., the fourth lens group $G_4$ have the same construction, the overall length at the wide-angle end is large. Diameters of lenses subsequent to the fourth lens group $G_4$ disadvantageously become large.

Hence, desirably those conditional expressions are met. Moreover, it is desirable that the following conditions be satisfied for enhancing the performance:

$$0.7 < TLT/fT < 0.85 \qquad (8)$$

$$-20 < \beta T3/\beta W3 < 10 \qquad (9)$$

$$0.7 < f_{2-3}/f_5 < 2.2 \qquad (10)$$

where

TLT: the total length at the wide-angle end, fT: the focal distance at the wide-angle end, $\beta T3$: the using magnification of the third lens group at the telephoto end, $\beta W3$: the using magnification of the third lens group at the wide-angle end, $f_{2-3}$: the synthetic focal distance of the second and third lens groups at the wide-angle end, and $f_5$: the focal distance of the fifth lens group.

The following is an explanation of the respective conditional expressions (8)–(10).

The conditional expression (8) prescribes an adequate ratio with respect to the total length TLT at the telephoto end and a magnitude of the focal distance fT.

If over an upper limit of the conditional expression (8), the total length TLT at the telephoto end increases. Diameters of front lens elements also disadvantageously augment. Whereas if under a lower limit of the conditional expression (8), the Petzval's sum deviates toward the negative side. It is disadvantageously difficult to ensure the sufficient back-focal distance at the wide-angle end.

The conditional expression (9) prescribes a proper ratio with respect to the using magnification $\beta T3$ of the third lens group $G_3$ at the telephoto end and the using magnification $\beta W3$ thereof at the wide-angle end.

If in excess of a range of the conditional expression (9), the fluctuations in the various aberrations, especially in the curvature of field, disadvantageously become excessive.

The conditional expression (10) prescribes a proper ratio with respect to the synthetic focal distance $f_{-3}$ of the second and third lens groups $G_2$, $G_3$ at the wide-angle end and the focal distance $f_5$ of the fifth lens group $G_5$. The lens groups other than, e.g., the second, third and fifth lens groups $G_2$, $G_3$, $G_5$ have the same constructions. In this case, if over an upper limit of the conditional expression (10), the fluctuations in the comatic aberration during the variable power by zooming become large, thereby inducing a tendency of an outside coma on the whole. The sufficient back-focal distance at the wide-angle end is ensured with difficulty.

Whereas if under a lower limit of the conditional expression (10), the total length at the wide-angle end disadvantageously increases. Besides, an air space required for the variable power through the fifth lens group $G_5$ is hard to take.

Moreover, it is desirable that the following conditions relative to the second and third lens groups $G_2$, $G_3$ be satisfied; and desirably the following conditional expressions are met:

$$-0.3 < N2- -N2+ < 0 \tag{11}$$

$$5 < \nu2- -\nu2+ < 20 \tag{12}$$

$$-1 < q2 < 3 \tag{13}$$

where q2 is the configurational factor of the second lens group, q3 is the configurational factor of the third lens group, and N2−, μ2− N2+, ν2+ are the refractive indices and the Abbe's numbers of negative and positive lenses constituting the second lens group $G_2$. However, the configurational factor q is expressed such as q=(Rb+ Ra)/(Rb−Ra), where Ra is the radius of curvature of the closest-to-object surface among the surfaces of lenses constituting the respective lens groups, and Rb is the radius of curvature of the closest-to-image surface among them.

The conditional expressions (11)–(13) will hereafter be described.

If over an upper limit of the conditional expression (11), the Petzval's sum becomes excessive on the positive side. A compensation of the image surface is difficult. Whereas if under a lower limit of the conditional expression (11), the Petzval's sum becomes excessive on the negative side. It is difficult to compensate the curvature of field.

If over an upper limit of the conditional expression (12), the axial chromatic aberration is compensated with deficiency. The compensation becomes difficult. Whereas if under a lower limit of the conditional expression (12), the axial chromatic aberration is excessively compensated. A preferable compensation is difficult.

When exceeding a range of the conditional expression (13), the spherical aberration is excessively compensated in an area of the variable power by zooming. Increased are the fluctuations in the curvature of field during the variable power by zooming. The high image-forming performance is not obtained.

Further, it is desirable that the following conditional expressions be satisfied:

$$0 < \phi \cdot f_3 < 2.0 \tag{14}$$

$$5 < \nu 3- -\nu 3+ -30 \tag{15}$$

$$-15 < q3 < 0 \tag{16}$$

where ν3−, ν3+ are the Abbe's numbers of negative and positive lenses constituting the third lens group, and φ is the refracting power of a joining surface of the negative and positive lenses constituting the third lens group or the refracting power of an air gap (so-called air lens) between the negative and positive lenses constituting the third lens group.

The conditional expressions (14)–(16) will hereafter be described.

If over an upper limit of the conditional expression (14), the refracting power becomes too great. The occurrence of a high-order aberration and fluctuations thereof become tremendous. The high image-forming performance is not obtained. In particular, a high-order spherical aberration at the telephoto end is remarkably produced on the positive side. The fluctuations in the image surface are also disadvantageously large. Whereas if under a lower limit of the conditional expression (14), the comatic aberration at the wide-angle end increases so much. Besides, the fluctuations in the comatic aberration and the image surface during the variable power by zooming also disadvantageously become tremendous.

If in excess of an upper limit of the conditional expression (15), the axial chromatic aberration is deficiently compensated. The compensation is hard to effect. Whereas if under a lower limit of the conditional expression (15), the axial chromatic aberration is excessively compensated. The compensation is also unpreferably difficult.

If beyond a range of the conditional expression (16), the spherical aberration is excessively compensated on the whole. Further, the fluctuations in the curvature of field during the variable power by zooming augment, thereby unpreferably obtaining no high image-forming performance.

Additionally, it is desirable that the space dimension DW3–4 between the third and fourth lens groups $G_3$, $G_4$ at the wide-angle end should satisfy the following condition:

$$0.2 < DW3-4/fW < 0.65 \tag{17}$$

When, for example, the fifth lens group G has the same construction, and if over an upper limit of the conditional expression (17), the spherical and comatic aberrations augment very much. The compensations thereof become difficult. Besides, diameters of the lenses of the fifth lens group $G_5$ become large, and disadvantageously the total length also increases. Whereas if under a lower limit thereof, an air space needed for governing the variable power by zooming is hard to ensure. This is not suited to an increment in the magnification. Further, an externally-oriented comatic aberration occurs at the wide-angle end. It is disadvantageously difficult to ensure the back-focal distance.

(B) Second Invention

In order to solve the above-noted problems, a second invention provides a telephoto zoom lens comprising, in succession from the object side, a first lens group G1 having positive refracting power, a second lens group G2 having negative refracting power, a third lens group G3 having negative refracting power, a fourth lens group G4 having positive refracting power, and a fifth lens group G5 having negative refracting power, wherein during variable power from a wide-angle end to a telephoto end, said lens groups move so that the space dimension between said first lens group G1 and said second lens group G2 increases, the space dimension between said second lens group G2 and said third lens group G3 linearly or non-linearly changes, and the space dimension between said fourth lens group G4 and said fifth lens group G5 decreases, characterized in that the following conditions are satisfied:

$$0.3 \leq f1/(fW \cdot fT)^{1/2} \leq 1.5$$
$$0.3 \leq f2/f3 \leq 5$$
$$-1.5 < \beta W23 < -0.5$$

where f1 is the focal distance of said first lens group G1, f2 is the focal distance of said second lens group G2, f3 is the focal distance of said third lens group G3, fW is the focal distance of the whole zoom lens system at the wide-angle end, fT is the focal distance of the whole zoom lens system at the telephoto end, and $\beta W23$ is the composite used magnification of said second lens group $G_2$ and said third lens group $G_3$.

According to a preferred embodiment of the present invention, the following condition is satisfied:

$$0.01 \leq (DT23-DW23)/fW \leq 0.6,$$

where DT23 is the air gap along the optical axis between said second lens group G2 and said third lens group G3 at the wide-angle end, DW23 is the air gap along the optical axis between said second lens group G2 and said third lens group G3 at the telephoto end, and fW is the focal distance of the whole zoom lens system at the wide-angle end. Further, it is preferable that the following conditions be satisfied:

$$0.6 < f4/|f5| < 1.2$$

$$0.55 < f1/|f2| < 1.2$$

where f1 is the focal distance of said first lens group G1, f2 is the focal distance of said second lens group G2, f4 is the focal distance of said fourth lens group G4, and f5 is the focal distance of said fifth lens group G5.

The conditional expressions of the second invention will hereinafter be described in detail.

In the telephoto zoom lens of the second invention, the relations of the aforementioned expressions (1) and (2) and the following expression (18) are satisfied in the above-described five-group construction:

$$0.3 \leq f1/(fW \cdot fT)^{1/2} \leq 1.5 \quad (1)$$

$$0.3 \leq f2/f3 \leq 5 \quad (2)$$

$$-1.5 < \beta W23 < -0.5 \quad (18)$$

where f1: the focal distance of the first lens group G1;

f2: the focal distance of the second lens group G2;

f3: the focal distance of the third lens group G3;

fW: the focal distance of the whole zoom lens system at the wide-angle end;

fT: the focal distance of the whole zoom lens system at the telephoto end;

$\beta W23$: the composite used magnification of the second lens group and the third lens group at the wide-angle end.

Conditional expression (18) prescribes an appropriate range regarding the composite used magnification of the second lens group $G_2$ and the third lens group G3 at the wide-angle end.

Now, as can be seen if reference is made to the four-group zoom lens (having positive, negative, positive and positive refracting power in succession from the object side) type heretofore widely used in the photographic telephoto zoom lens, the function of the lens group having negative refracting power which succeeds to the first lens group having positive refracting power is important in the construction of the telephoto zoom lens and is also important in effecting variable power and aberration correction.

In the present invention, design is made such that the second lens group G2 and the third lens group G3 effect variable power and aberration correction independently of each other, and the composite magnification of the second lens group G2 and the third lens group G3 at the wide-angle end has been considered from the above-noted viewpoint to thereby obtain conditional expression (18).

If the upper limit value of conditional expression (18) is exceeded, the magnitude of the composite used magnification of the second lens group G2 and the third lens group G3 at the wide-angle end will become too great and it will become difficult to secure a sufficient back focal length at the wide-angle end. In addition, various aberrations created in the first lens group G1 will be enlarged and good aberration correction in the final image plane will become difficult.

Particularly, at the wide-angle end, extroversive coma will be created in the rays of light under the principal ray of light, and this is inconvenient. Further, during variable power, the fluctuation of curvature of image field and the fluctuation of astigmatism will become very great and therefore, a good imaging performance will not be obtained during variable power. If the upper limit value is −0.85 or less, a better imaging performance will be obtained.

If conversely, the lower limit value of conditional expression (18) is exceeded, the magnitude of the composite used magnification of the second lens group G2 and the third lens group G3 at the wide-angle end will become too small and the full length will become great. This is not only unsuitable for making the lens system compact, but also results in an increase in the lens diameters of the third lens group G3 and subsequent lens groups and thus, an increase in the diameter of the lens barrel. Also, at the wide-angle end, distortion will become excessively great toward the negative side, and this is inconvenient.

Also, it is desirable to design such that during variable power from the wide-angle end to the telephoto end, the magnitude of the composite used magnification of the second lens group G2 and the third lens group G3 is increased. If the lower limit value is −1.15 or greater, a better imaging performance will be obtained.

To obtain a better imaging performance, it is desirable to satisfy the aforementioned expressions (5) and (7) and the following conditions (19) and (20), in addition to the aforementioned conditions:

$$0.01 \leq (DT23-DW23)/fW =< 0.6 \quad (19)$$

$$0.6 < f4/|f5| < 1.2 \quad (5)$$

$$0.55 < f1/|f2| < 1.2 \quad (20)$$

$$0.8 < |f3|/fW < 2.0 \quad (7)$$

where

DT23: the on-axis air gap between the second lens group G2 and the third lens group G3 at the telephoto end;

DW23: the on-axis air gap between the second lens group G2 and the third lens group G3 at the wide-angle end;

fW: the focal distance of the whole zoom lens system at the wide-angle end;

f1: the focal distance of the first lens group G1;

f2: the focal distance of the second lens group G2;

f3: the focal distance of the third lens group G3;

f4: the focal distance of the fourth lens group G4;

f5: the focal distance of the fifth lens group G5.

Conditional expression (19) prescribes an appropriate rate, regarding the difference between the on-axis air gap between the second lens group G2 and the third lens group G3 at the wide-angle end and the on-axis air gap between the second lens group G2 and the third lens group G3 at the telephoto end, and the focal distance fW of the whole zoom lens system at the wide-angle end.

If the upper limit value of conditional expression (19) is exceeded, the full length at the telephoto end will become too great and the diameter of the fore lens will increase. Also, at both of the wide-angle end and the telephoto end, curvature of image field will move greatly toward the negative side and spherical aberration at the telephoto end will become under-corrected, and this is not preferable.

If conversely, the lower limit value of conditional expression (19) is exceeded, it will be impossible to secure a great variation in the used magnification of the third lens group G3. Therefore, not only it will become difficult to make the magnification higher and equalize the burdens of aberration correction of the respective lens groups during variable power, but the fluctuations of various aberrations during variable power will become great. Particularly, the fluctuations of curvature of image field and coma will become great and at both of the wide-angle end and the telephoto end, curvature of image field will become excessively great toward the negative side. Further, positive lower coma will be created at the wide-angle end and spherical aberration at the telephoto end will become liable to be overcorrected, and this is not preferable.

To overcome not only the above-described conditions regarding the on-axis air gaps between the second lens group G2 and the third lens group G3 at the wide-angle end and the telephoto end, but also the aberration fluctuation in the focal distance state except at the two ends (the wide-angle end and the telephoto end) during variable power (hereinafter referred to as the intermediate focal distance state) to thereby achieve a good imaging performance, the relative positional relations among the lens groups in the intermediate focal distance state are important.

In the present invention, during variable power from the wide-angle end to the telephoto end, the space dimension between the second lens group G2 and the third lens group G3 linearly or non-linearly changes. For simplification, it is to be understood that the second lens group G2 is fixed during zooming, and the movement locus of the third lens group G3 will now be described.

Where the third lens group G3 assumes a non-linear locus convex toward the object side, considering a ray of light L from the on-axis object point emerging from the second lens group G2 in the intermediate focal distance state, the ray of light L has the following nature: when the ray of light L diverges, spherical aberration can be moved toward the negative side, and when the ray of light L converges, spherical aberration and curvature of image field can be moved toward the positive side.

Where conversely, the third lens group G3 assumes a non-linear locus concave toward the object side, the ray of light L has the following nature: when the ray of light L diverges, spherical aberration can be moved toward the positive side, and when the ray of light L converges, spherical aberration and curvature of image field can be moved toward the negative side.

Also, when the ray of light L is substantially parallel to the optical axis, spherical aberration becomes substantially constant irrespective of the position of the third lens group G3. However, curvature of image field moves toward the positive side when the third lens group G3 is moved toward the object side, and moves toward the negative side when the third lens group G3 is moved toward the image side. If such a nature is utilized, such aberration fluctuation that cannot be corrected by the other lens groups than the second lens group G2 and the third lens group G3 can be eliminated. This is apparent from embodiments which will be described later.

However, when the degree of freedom of the aberration correction by the other lens groups than the second lens group G2 and the third lens group G3 is sufficient, a good imaging performance will be obtained even if the locus of the third lens group G3 is linear.

Conditional expression (20) will now be described.

Conditional expression (20) prescribes an appropriate rate, regarding the focal distance f1 of the first lens group G1 and the focal distance of the second lens group G2.

If the upper limit value of conditional expression (20) is exceeded, the focal distance of the second lens group G2 will become too short, and where for example, the third lens group G3 and subsequent lens groups are of the same construction, the full length at the wide-angle end will become great and lower coma at the wide-angle end will become excessively great toward the positive side and Petzval sum will incline toward the negative side, and this is inconvenient.

If conversely, the lower limit value of conditional expression (20) is exceeded, the focal distance of the second lens group G2 will become too long, and where the third lens group G3 and subsequent lens group are of the same construction, it will become difficult to secure a sufficient back focal length at the wide-angle end and the fluctuation of curvature of image field during zooming will become great, and this is inconvenient.

Also, conditional expression (20) shows that the refracting power of the second lens group G2 relative to the first lens group G1 is loosely used as compared with that in the prior-art telephoto zoom lens.

Further, to enhance the imaging performance, it is desirable to satisfy the following conditions, in addition to the aforementioned conditions:

$$1.72 < N3- \tag{21}$$

$$40 < \nu 3- \tag{22}$$

$$0.25 < f(\beta 3 = -1)/fT < 1.0 \tag{23}$$

$$-0.5 < \beta W3 < -0.1 \tag{24}$$

where

N3–: the refractive index of a concave lens in the third lens group G3 which is most adjacent to the object side;

ν3–: the Abbe's number of the concave lens in the third lens group G3 which is most adjacent to the object side;

βW3: the used magnification of the third lens group G3 at the wide-angle end;

f(β3 =–1): the focal distance of the whole zoom lens system when during variable power, the used magnification β3 of the third lens group G3 is –1.

Conditional expressions (21) and (22) prescribe appropriate ranges, regarding the magnitudes of the refractive index and Abbe's number of the concave lens in the third lens group G3 which is most adjacent to the object side for d-ray (λ=587.6 nm).

If the range of conditional expression (21) is departed from, spherical aberration at the telephoto end will be liable to become great toward the positive side and the fluctuation of spherical aberration during variable power will become great, and this is inconvenient.

Also, if the range of conditional expression (22) is departed from, on-axis chromatic aberration of a short wavelength at the wide-angle end will become liable to shift toward the negative side and the fluctuation of chromatic difference of magnification during variable power will become great, and this is inconvenient.

Conditional expression (23) prescribes an appropriate range regarding the focal distance of the whole zoom lens system when during variable power, the used magnification of the third lens group G3 is 31 1. By thus using a magnification nearly −1 time as the used magnification β3 of the third lens group G3 during variable power, it is possible to make the amount of movement on the optical axis during variable power small and yet obtain a sufficient variable power ratio.

If the upper limit value of conditional expression (23) is exceeded, the fluctuations of various abberations during variable power, particularly the fluctuation of curvature of image field, will become excessively great, and this is inconvenient. Also, the amount of movement of the third lens group G3 during variable power will become too great and the full length will become great, and this is inconvenient.

If conversely, the lower limit value of conditional expression (23) is exceeded, not only the amount of movement of the third lens group G3 during variable power and the fluctuations of various aberrations, particularly the fluctuations of astigmatism and curvature of image field, will become excessively great, but the correction of coma under the principal ray of light will become difficult. Also, the amount of movement of the third lens group G3 during variable power will become too great and the full length will become great, and this is inconvenient. Conditional expression (24) prescribes the magnitude of the used magnification of the third lens group G3 at the wide-angle end.

If the upper limit value of conditional expression (24) is exceeded, not only the magnitude of the used magnification of the third lens group G3 at the wide-angle end will become too great and it will become difficult to secure a sufficient back focal length at the wide-angle end, but various aberrations created in the first lens group G1 and the second lens group G2 will be enlarged and good aberration correction in the final image plane will become difficult.

Particularly, at the wide-angle end, extroversive coma will be created in the rays of light under the principal ray of light, and this is inconvenient. In addition, the fluctuation of curvature of image field and the fluctuation of astigmatism will become very great during variable power and therefore, a good imaging performance will not be obtained during variable power.

If conversely, the lower limit value of conditional expression (24) is exceeded, not only the magnitude of the used magnification of the third lens group G3 at the wide-angle end will become too small and the full length will become great and this is not suitable for making the lens system compact, but the lens diameters of the fourth lens group G4 and subsequent lens group will become large, thus resulting in an increase in the diameter of the lens barrel.

Design may desirably be made such that the magnitude of the used magnification of the third lens group G3 is increased during variable power from the wide-angle end to the telephoto end.

When the zoom lens is to be actually constructed, it is desirable to construct it such that the fourth lens group G4 and the fifth lens group G5 are moved toward the object side during variable power from the wide-angle end to the telephoto end. At this time, it is desirable to use the zoom lens such that the magnitude of the used magnification of the fifth lens group G5 increases.

Further, when the used magnification of the second lens group G2 is β2 during variable power from the wide-angle end to the telephoto end, it is desirable to use the zoom lens within a range which satisfies the following condition:

$$1<\beta 2. \tag{25}$$

By using the zoom lens within the range of conditional expression (25), it is also possible to make the second lens group G2 into a simple lens construction comprising about two lenses and the deterioration of the performance is small even for the eccentricity error during manufacture, and this is preferable.

Also, in aberration correction, the creation of various aberrations in the second lens group G2 can be made small, and this is preferable. This condition is particularly effective for the correction of the coma of the rays of light under the principal ray of light at the wide-angle end and the correction of spherical aberration at the telephoto end.

When the second lens group G2 is to be made into a lens construction comprising two lenses, it is desirable to make it into a construction comprising a concave lens and a convex lens. When at this time, the focal distance of the concave lens is f2− and the focal distance of the second lens group G2 is f2 and the refractive index of the convex lens is N+, it is desirable to satisfy the following conditions:

$$0.1<|f2-/f2|<0.7 \tag{26}$$

$$N+<1.55 \tag{27}$$

BRIEF DESCRIPTION OF THE DRAWINGS

Other objects and advantages of the present invention will become apparent during the following discussion in conjunction with the accompanying drawings, in which:

FIGS. 4A, 4B and 4C are views each illustrating a geometry of lenses in an embodiment 3;

FIGS. 6A, 6B and 6C are views each illustrating a geometry of lenses in an embodiment 5;

FIG. 7 shows the construction of a telephoto zoom lens according to a sixth embodiment of the present invention;

DESCRIPTION OF THE PREFERRED EMBODIMENTS (A) First Invention

Embodiments of the first invention will hereafter be described, respectively.

EMBODIMENT 1

Figure 1:
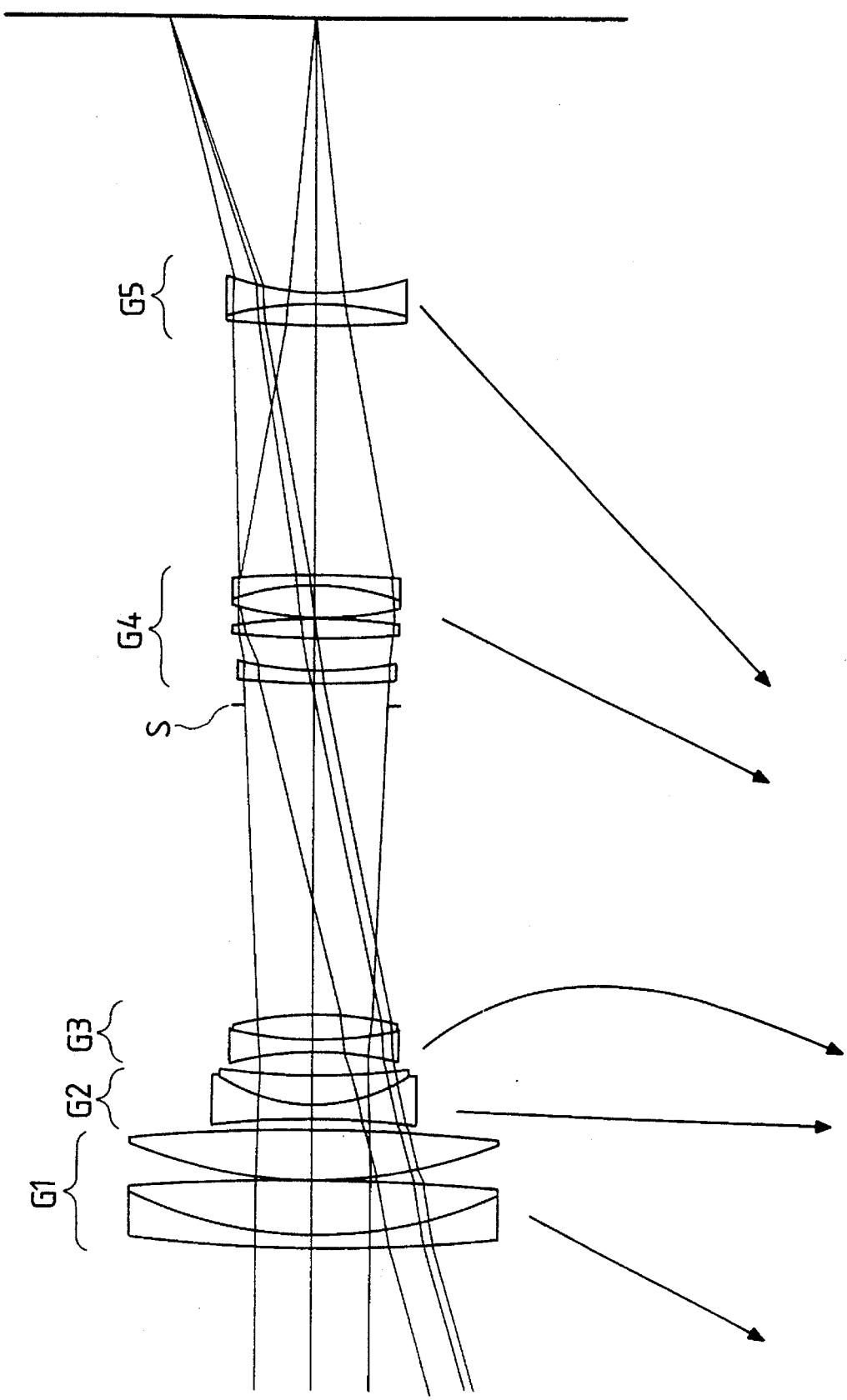
FIG. 1 is a view schematically showing a principle of the present invention.
Figures 2A, 2B, 2C:
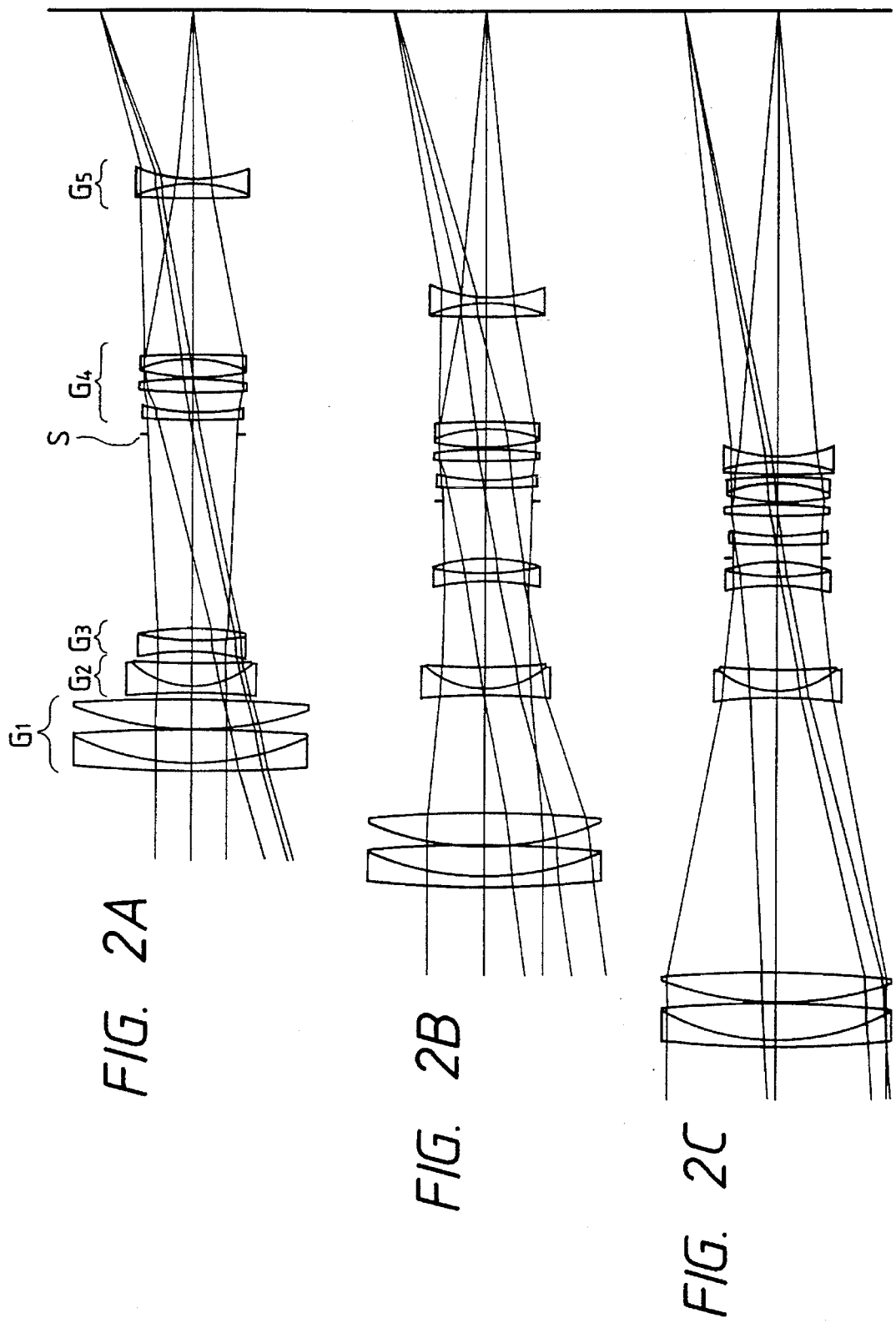
FIGS. 2A, 2B and 2C are views each illustrating a geometry of lenses in an embodiment 1.

FIGS. 2A–2C are views each illustrating a geometry of lenses on an embodiment 1. FIG. 2A shows a wide-angle end. FIG. 2B shows a state of an intermediate focal distance. FIG. 2C shows a telephoto end.

A telephoto zoom lens, sequentially from an object side, comprises: a first lens group $G_1$ constructed of a cemented lenses of a negative meniscus lens and a biconvex lens and a positive lens; a second lens group $G_2$ constructed of cemented lenses of a biconcave negative lens and a positive meniscus lens; a third lens group $G_3$ constructed of cemented lenses of a biconcave negative lens and a biconvex positive lens; a fourth lens group $G_4$ constructed of a stop S, a negative meniscus lens, a biconvex lens and cemented lenses of a biconvex lens and a negative meniscus lens; and a fifth lens group constructed of cemented lenses of a biconvex lens and a biconcave lens.

The following Table 1 shows values of items in the embodiment 1. In Table 1 of the items in accordance with the embodiment, the symbol f is the focal distance, $F_{NO}$ is the F-number, and $2\omega$ is the field angle. Then, the numerals at the left end represent the order from the object side. The symbol r is the radius of curvature of the lens surface, d is the space dimension between the lens surfaces. The refractive index n and the Abbe's number are values with respect to a d-ray ($\lambda$=587.6 nm). D0 shows a distance between an object and first surface of a lens.

TABLE 1

(First Embodiment)

f = 76.5–292
$F_{NO}$ + 4.61–5.69
$2\omega$ = 33.04°–8.1°

| | r | d | $\upsilon$ | n |
|---|---|---|---|---|
| 1 | 84.843 | 1.80 | 39.6 | 1.80454 |
| 2 | 6.244 | 7.30 | 82.6 | 1.49782 |
| 3 | −506.222 | .20 | | |
| 4 | 5.029 | 7.00 | 59.0 | 1.51823 |
| 5 | −327.593 | (d5 = variable) | | |
| 6 | −101.060 | 1.60 | 45.9 | 1.54814 |
| 7 | 2.847 | 4.30 | 32.2 | 1.67270 |
| 8 | 3.254 | (d8 = variable) | | |
| 9 | −45.767 | 1.50 | 40.9 | 1.79631 |
| 10 | 2.841 | 3.50 | 33.7 | 1.64831 |
| 11 | −52.363 | (d11 = variable) | | |
| 12 | 125.530 | 1.80 | 23.0 | 1.86074 |
| 13 | 1.372 | 4.50 | | |
| 14 | 119.505 | 2.50 | 60.0 | 1.64000 |
| 15 | −105.952 | .50 | | |
| 16 | 49.850 | 4.50 | 57.0 | 1.62280 |
| 17 | −33.059 | 1.30 | 38.2 | 1.65128 |
| 18 | −100.053 | (d18 = variable) | | |
| 19 | 186.308 | 3.00 | 25.5 | 1.80458 |
| 20 | −44.327 | 1.40 | 39.6 | 1.80454 |
| 21 | 37.341 | (d21 = variable) | | |

The variable space dimensions in variable power in the first embodiment are given as follows:

| F | 76.5000 | 150.0000 | 292.0000 |
|---|---|---|---|
| DO | ∞ | ∞ | ∞ |
| d5 | 1.7915 | 27.3961 | 62.8201 |
| d8 | 3.5488 | 19.7091 | 19.3674 |
| d11 | 46.3521 | 15.6734 | 3.7959 |
| d18 | 34.9130 | 23.8268 | .6220 |
| d21 | 38.3281 | 63.9327 | 99.3567 |

The condition corresponding numerical values in the first embodiment are given as follows:

| (1) | $f_1/(fW \cdot fT)^{1/2} = 0.8698$ |
|---|---|
| (2) | $F_2/f_3 = 0.9935$ |
| (3) | $(DT_{2-3} - DW_{2-3})/fW = 0.2068$ |
| (4) | $|f_{2-3}/fW| = 0.91307$ |
| (5) | $|f_4/|f_5| = 0.8219$ |
| (6) | $f_1/|f_2| = 0.93525$ |
| (7) | $|f_3|/fW = 1.82889$ |
| (8) | $TLT/fT = 0.79679$ |
| (9) | $\beta T3/\beta W3 = -19.822$ |
| (10) | $f_{2-3}/f_5 = 1.18732$ |
| (11) | $N2-- N2+ = -0.12456$ |
| (12) | $\upsilon 2-- \upsilon 2+ = 13.699$ |
| (13) | $q2 = -0.04017$ |
| (14) | $\phi \cdot f_3 = 0.39175$ |
| (15) | $\upsilon 3-- \upsilon 3+ = 7.152$ |
| (16) | $q3 = -14.879$ |
| (17) | $DW3-4/fW = 0.6059$ |

EMBODIMENT 2

Figures 3A, 3B, 3C:
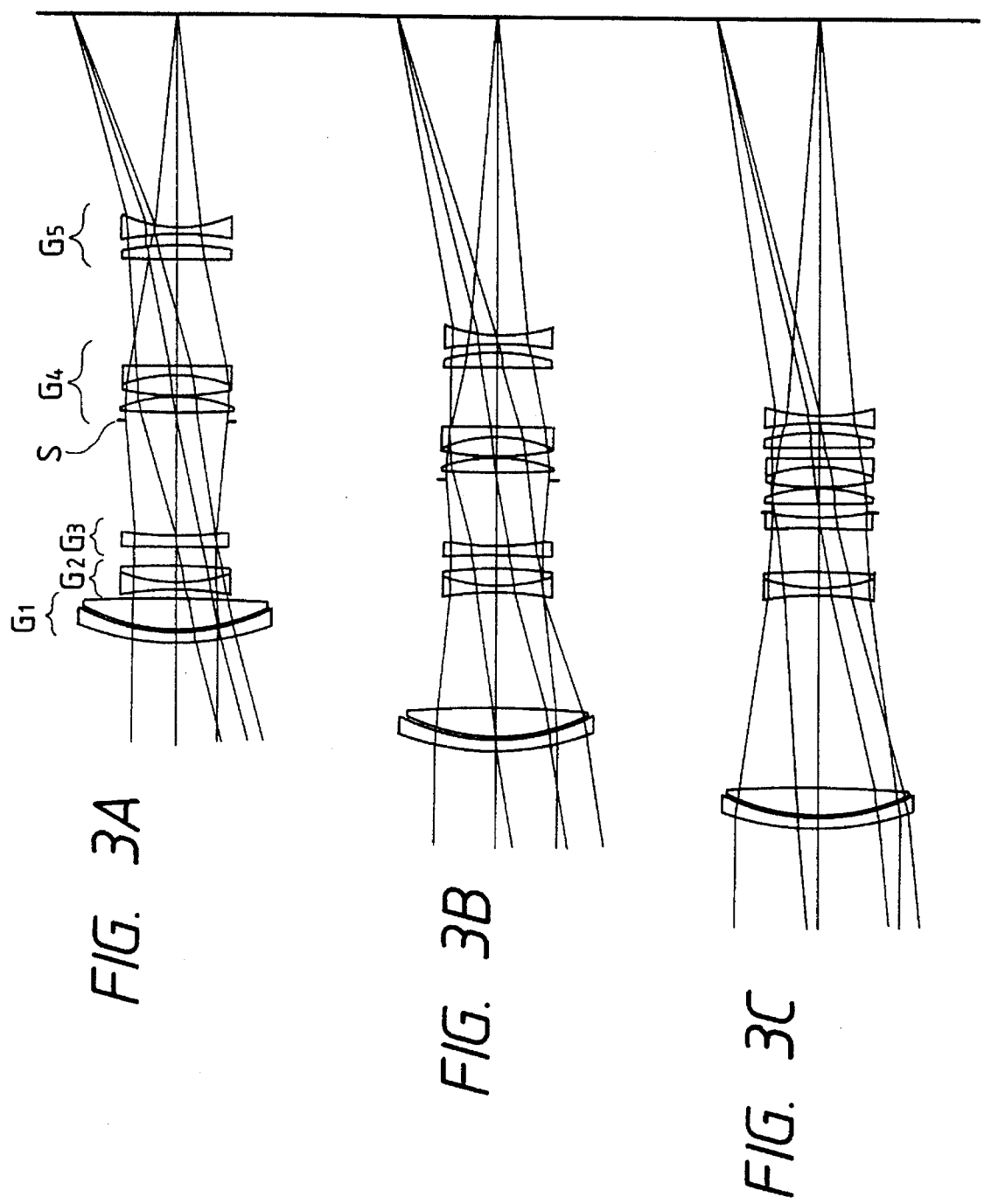
FIGS. 3A, 3B and 3C are views each illustrating a geometry of lenses in an embodiment 2.

FIGS. 3A–3C are views each illustrating a geometry of lenses on an embodiment 2. FIG. 3A shows a wide-angle end. FIG. 3B shows a state of an intermediate focal distance. FIG. 3C shows a telephoto end.

A telephoto zoom lens, sequentially from an object side, comprises: a first lens group $G_1$ constructed of a negative meniscus lens and a biconvex positive lens; a second lens group $G_2$ constructed of cemented lenses of 1a biconcave negative lens and a biconvex positive lens; a third lens group $G_3$ constructed of a biconcave negative lens; a fourth lens group $G_4$ constructed of a step S, a biconvex lens and cemented lenses of a biconvex lens and a negative meniscus lens; and a fifth lens group constructed of a biconvex lens and a biconcave lens.

Based on the construction described above, the embodiment 2 provides the lenses applicable to the side of a relatively short focal point. A lens geometry is simple, wherein the third lens group $G_3$ is constructed of a single piece of lens.

The following Table 2 shows values of items in the embodiment 2. In Table 2 of the items in accordance with the embodiment, the symbol f is the focal distance, $F_{NO}$ is the F-number, and $2\omega$ is the field angle. Then, the numerals at the left end represent the order from the object side. The symbol r is the radius of curvature of the lens surface, d is the space dimension between the lens surfaces. The refractive index n and the Abbe's number are values with respect to a d-ray ($\lambda$=587.6 nm). D0 is a distance between an object and first surface of a lens.

TABLE 2

(Second Embodiment)

f = 82–196
$F_{NO}$ = 4.6–5.7
$2\omega$ = 29.66°–12.16°

| | r | d | $\upsilon$ | n |
|---|---|---|---|---|
| 1 | 53.631 | 2.20 | 23.0 | 1.86074 |
| 2 | 39.941 | .50 | | |
| 3 | 42.000 | 6.00 | 69.9 | 1.51860 |
| 4 | −253.597 | (d4 = variable) | | |
| 5 | −46.982 | 1.50 | 47.1 | 1.67003 |
| 6 | 37.449 | 3.00 | 27.6 | 1.75520 |
| 7 | −154.003 | (d7 = variable) | | |
| 8 | −250.166 | 2.00 | 47.5 | 1.78797 |
| 9 | 78.415 | (d9 = variable) | | |
| 10 | 152.812 | 3.00 | 46.4 | 1.58267 |
| 11 | −37.057 | .20 | | |
| 12 | 50.036 | 4.50 | 60.7 | 1.56384 |
| 13 | −31.136 | 1.70 | 25.5 | 1.80458 |
| 14 | −354.680 | (d14 = variable) | | |
| 15 | −488.183 | 3.00 | 26.1 | 1.78470 |
| 16 | −46.681 | 2.07 | | |
| 17 | −50.713 | 1.50 | 53.7 | 1.69350 |
| 18 | 35.916 | (d18 = variable) | | |

The variable space dimensions in variable power in the second embodiment are given as follows:

| F | 82.0000 | 135.0000 | 196.0000 |
|---|---|---|---|
| D0 | ∞ | ∞ | ∞ |
| d4 | 2.1562 | 23.7506 | 39.4991 |
| d7 | 4.1898 | 2.7190 | 8.8577 |
| d9 | 24.9438 | 14.6750 | 2.8315 |
| d14 | 22.0952 | 12.2404 | 2.1968 |
| d18 | 43.0664 | 64.6608 | 80.4093 |

The condition corresponding numerical values in the second embodiment are given as follows:

| | |
|---|---|
| (1) | $f_1/(fW \cdot fT)^{1/2} = 0.87572$ |
| (2) | $F_2/f_3 = 1.92046$ |
| (3) | $(DT_{2-3} - DW_{2-3})/fW = 0.0569$ |
| (4) | $|f_{2-3}|/fW = 0.58$ |
| (5) | $f_4/|f_5| = 0.6544$ |
| (6) | $f_1/|f_2| = 0.76507$ |
| (7) | $|f_3|/fW = 0.92146$ |
| (8) | $TLT/fT = 0.84164$ |
| (9) | $\beta T3/\beta W3 = 7.62219$ |
| (10) | $f_{2-3}/f_5 = 0.79665$ |
| (11) | $N2- - N2+ = -0.08517$ |
| (12) | $\upsilon 2- - \upsilon 2+ = 19.453$ |
| (13) | $q2 = 1.87799$ |
| (16) | $q3 = -0.5227$ |
| (17) | $DW3-4/fW = 0.3042$ |

EMBODIMENT 3

FIGS. 4A–4C are views each illustrating a geometry of lenses on an embodiment 3. FIG. 4A shows a wide-angle end. FIG. 4B shows a state of an intermediate focal distance. FIG. 4C shows a telephoto end.

A telephoto zoom lens, sequentially from an object side, comprises: a first lens group $G_1$ constructed of a negative meniscus lens and a biconvex positive lens; a second lens group $G_2$ constructed of cemented lenses of a biconcave negative lens and a biconvex positive lens; a third lens group $G_3$ constructed of a biconcave negative lens; a fourth lens group $G_4$ constructed of a stop S, a biconvex positive lens and cemented lenses of a biconvex positive lens and a negative meniscus lens; and a fifth lens group constructed of cemented lenses of a positive lens exhibiting a large convexity on the image-side and a biconcave lens.

The embodiment 3 has substantially the same geometry in the embodiment 2. Each group, however, has different refracting power and configuration.

The following Table 3 shows values of items in the embodiment 3. In Table 3 of the items in accordance with the embodiment, the symbol f is the focal distance, $F_{NO}$ is the F-number, and $2\omega$ is the field angle. Then, the numerals at the left end represent the order from the object side. The symbol r is the radius of curvature of the lens surface, d is the space dimension between the lens surfaces. The refractive index n and the Abbe's number are values with respect to a d-ray ($\lambda$=587.6 nm). D0 is a distance between an object and first surface of a lens.

TABLE 3

(Third Embodiment)

f = 82–196
$F_{NO}$ = 4.62–5.7
$2\omega$ = 29.24°–12.08°

| | r | d | υ | n |
|---|---|---|---|---|
| 1 | 53.993 | 2.20 | 25.5 | 1.840458 |
| 2 | 37.137 | .50 | | |
| 3 | 37.749 | 7.00 | 64.1 | 1.51680 |
| 4 | −228.729 | (d4 = variable) | | |
| 5 | −42.349 | 1.50 | 42.0 | 1.66755 |
| 6 | 32.372 | 3.00 | 27.6 | 1.75520 |
| 7 | −105.299 | (d7 = variable) | | |
| 8 | −300.511 | 2.00 | 47.5 | 1.78797 |
| 9 | 68.734 | (d9 = variable) | | |
| 10 | 4.746 | 3.00 | 46.4 | 1.58267 |
| 11 | −35.274 | .50 | | |
| 12 | 5.251 | 4.50 | 60.7 | 1.56384 |
| 13 | −32.297 | 1.70 | 25.5 | 1.80458 |
| 14 | −242.346 | (d14 = variable) | | |
| 15 | .000 | 4.00 | 26.1 | 1.78470 |
| 16 | −24.282 | 1.50 | 38.8 | 1.67163 |
| 17 | 8.801 | (d17 = variable) | | |

The variable space dimensions in variable power in the third embodiment are given as follows:

| F | 82.0000 | 135.0000 | 196.0000 |
|---|---|---|---|
| D0 | ∞ | ∞ | ∞ |
| d4 | 2.8064 | 24.7099 | 39.9550 |
| d7 | 2.9810 | .5461 | 7.4257 |
| d9 | 24.5298 | 14.9373 | 2.7893 |
| d14 | 23.3891 | 13.5130 | 3.5363 |
| d17 | 40.6047 | 62.50817 | 77.7533 |

The condition corresponding numerical values in the third embodiment are given as follows:

| | |
|---|---|
| (1) | $f_1/(fW \cdot fT)^{1/2} = 0.85119$ |
| (2) | $F_2/f_3 = 2.52866$ |
| (3) | $(DT_{2-3} - DW_{2-3})/fW = 0.0542$ |
| (4) | $|f_{2-3}|/fW = 0.58683$ |
| (5) | $f_4/|f_5| = 0.70795$ |
| (6) | $f_1/|f_2| = 0.60258$ |
| (7) | $|f_3|/fW = 0.86366$ |
| (8) | $TLT/fT = 0.83091$ |
| (9) | $\beta T3/\beta W3 = 8.14148$ |
| (10) | $f_{2-3}/f_5 = 0.89343$ |
| (11) | $N2- - N2+ = -0.08765$ |
| (12) | $\upsilon 2- - \upsilon 2+ = 14.35$ |
| (13) | $q2 = 2.34549$ |
| (16) | $q3 = -0.62770$ |
| (17) | $DW3-4/fW = 0.2991$ |

EMBODIMENT 4

Figures 5A, 5B, 5C:
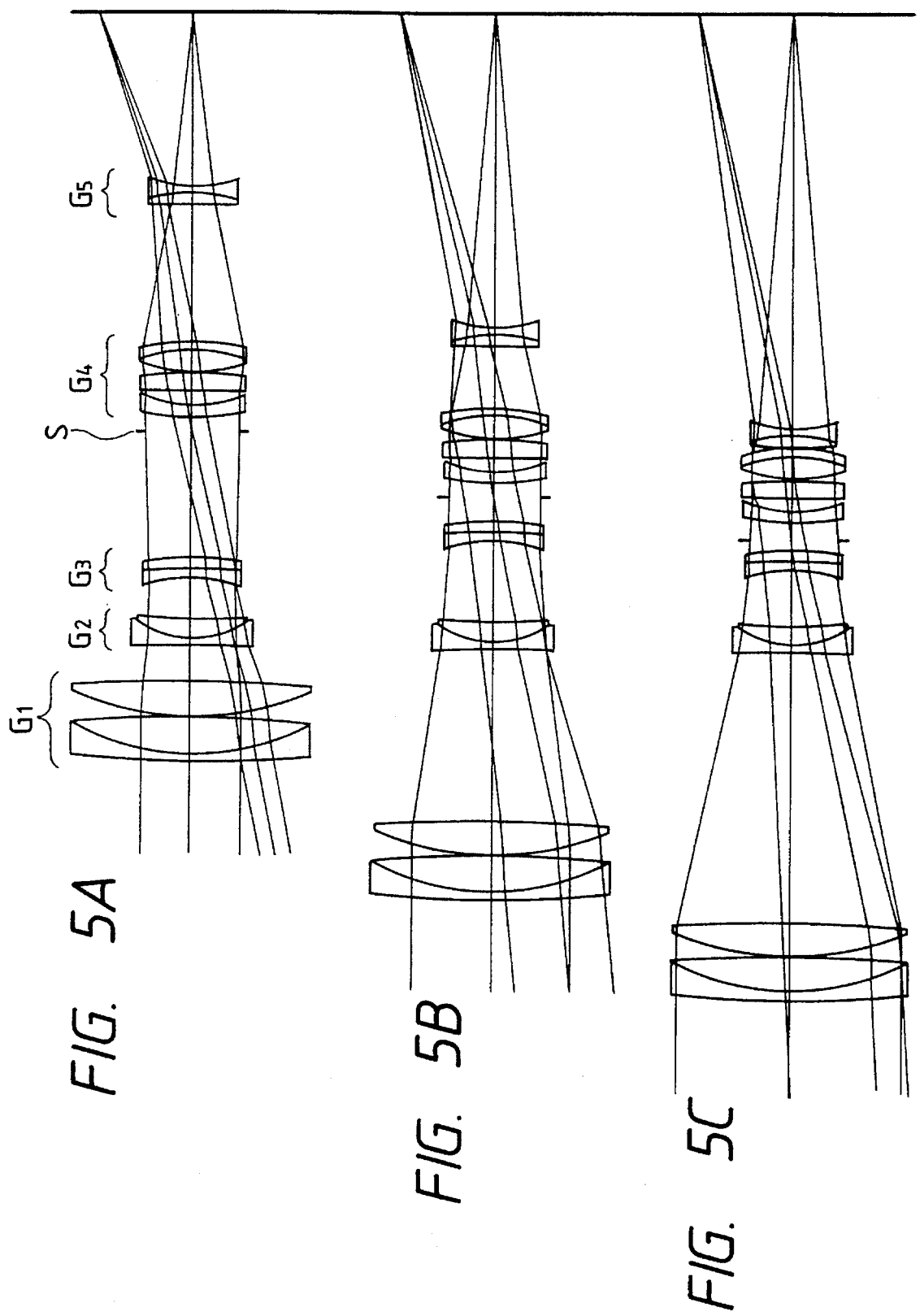
FIGS. 5A, 5B and 5C are views each illustrating a geometry of lenses in an embodiment 4.

FIGS. 5A–5C are views each illustrating a geometry of lenses on an embodiment 4. FIG. 5A shows a wide-angle end. FIG. 5B shows a state of an intermediate focal distance. FIG. 5C shows a telephoto end.

A telephoto zoom lens, sequentially from an object side, comprises: a first lens group $G_1$ constructed of cemented lenses of a negative meniscus lens with its convex surface toward the object and a biconvex lens; a second lens group $G_2$ constructed of cemented lenses of a biconcave negative lens and a positive meniscus lens; a third lens group $G_3$ constructed of cemented lenses of two pieces of negative meniscus lenses with their concave surfaces toward the object; a fourth lens group $G_4$ constructed of a stop S, a negative meniscus lens, a biconvex positive lens and cemented lenses of a biconvex positive lens and a negative meniscus lens with its concave surface toward the object; and a fifth lens group constructed of cemented lenses of a biconvex positive lens and a biconcave negative lens.

Based on the geometry given above, an excellent compensation of chromatic aberration is attained in the embodiment 4.

The following Table 4 shows values of items in the embodiment 4. In Table 3 of the items in accordance with the embodiment, the symbol f is the focal distance, $F_{NO}$ is the F-number, and $2\omega$ is the field angle. Then, the numerals at the left end represent the order from the object side. The symbol r is the radius of curvature of the lens surface, d is the space dimension between the lens surfaces. The refractive index n and the Abbe's number are values with respect to a d-ray ($\lambda$=587.6 nm). D0 shows a distance between an object and first surface of a lens.

TABLE 4

(Fourth Embodiment)

f = 102.5–292
$F_{NO}$ = 4.62–5.69
$2\omega$ = 23.32°–8.18°

| | r | d | υ | n |
|---|---|---|---|---|
| 1 | 244.826 | 2.00 | 44.7 | 1.80218 |
| 2 | 60.389 | 7.50 | 82.6 | 1.49782 |
| 3 | −477.858 | .20 | | |
| 4 | 64.724 | 7.20 | 69.9 | 1.51860 |
| 5 | −515.076 | (d5 = variable) | | |
| 6 | −1586.105 | 2.00 | 31.6 | 1.75692 |
| 7 | 23.033 | 3.60 | 25.5 | 1.80458 |
| 8 | 105.851 | (d8 = variable) | | |
| 9 | −39.172 | 2.00 | 49.4 | 1.77279 |
| 10 | −112.696 | 2.30 | 25.5 | 1.80458 |
| 11 | −58.945 | (d11 = variable) | | |
| 12 | 55.181 | 2.50 | 23.0 | 1.86074 |
| 13 | 31.581 | 3.00 | | |
| 14 | 386.036 | 4.00 | 69.9 | 1.51860 |
| 15 | −104.239 | .50 | | |
| 16 | 37.534 | 4.80 | 60.7 | 1.56384 |
| 17 | −33.568 | 1.50 | 32.2 | 1.67270 |
| 18 | −51.350 | (d18 = variable) | | |
| 19 | 1.194 | 2.50 | 25.5 | 1.80458 |
| 20 | −39.387 | 1.80 | 46.5 | 1.80411 |
| 21 | 34.827 | (d21 = variable) | | |

The variable space dimensions in variable power in the fourth embodiment are given as follows:

| F | 102.5000 | 200.0000 | 292.0000 |
|---|---|---|---|
| D0 | ∞ | ∞ | ∞ |
| d5 | 7.8656 | 37.2463 | 58.5971 |
| d8 | 9.1243 | 17.6025 | 12.2821 |
| d11 | 30.5065 | 8.5766 | 5.7116 |
| d18 | 29.4990 | 13.5700 | .4045 |
| d21 | 38.7204 | 68.1010 | 89.4519 |

The condition corresponding numerical values in the fourth embodiment are given as follows:

| (1) | $f_1/(fW \cdot fT)^{1/2}$ = 0.69363 |
|---|---|
| (2) | $f_2/f_3$ = 0.95434 |
| (3) | $(DT_{2-3} - DW_{2-3})/fW$ = 0.0308 |
| (4) | $|f_{2-3}/fW|$ = 0.82673 |
| (5) | $f_4/|f_5|$ = 1.06853 |
| (6) | $f_1/|f_2|$ = 0.71856 |
| (7) | $|f_3|/fW$ = 1.70722 |
| (8) | TLT/fT = 0.73235 |
| (9) | $\beta T3/\beta W3$ = −1.040 |
| (10) | $f_{2-3}/f_5$ = 1.89152 |
| (11) | N2− − N2+ = −0.04766 |
| (12) | υ2− − υ2+ = 6.124 |
| (13) | q2 = −0.87488 |
| (14) | $\phi \cdot f_3$ = 0.049 |
| (15) | υ3− − υ3+ = 23.953 |
| (16) | q3 = −4.9623 |
| (17) | DW3-4/fW = 0.2976 |

EMBODIMENT 5

FIGS. 6A–6C are views each illustrating a geometry of lenses on an embodiment 2. FIG. 6A shows a wide-angle end. FIG. 6B shows a state of an intermediate focal distance. FIG. 6C shows a telephoto end.

A telephoto zoom lens, sequentially from an object side, comprises: a first lens group $G_1$ constructed of cemented lenses of a negative meniscus lens with a convex surface toward the object and a biconvex lens and a positive meniscus lens with its convex surface toward the object; a second lens group $G_2$ constructed of a biconcave negative lens and a positive meniscus lens with its convex surface toward the object; a third lens group $G_3$ constructed of two pieces of negative meniscus lenses with their concave surfaces toward the object; a fourth lens group $G_4$ constructed of a stop S, a negative meniscus lens with its convex surface toward the object, a positive meniscus lens with its concave surface toward the object, a biconvex positive lens and a negative meniscus lens with its concave surface toward the object; and a fifth lens group constructed of a positive meniscus lens with its concave surface toward the object and a biconcave negative lens.

The embodiment 5 is characterized by a geometry wherein the lens group, closest to the image, of the fourth lens group, the second lens group $G_2$, the third lens group $G_3$ and the fifth lens group $G_5$ are separately arranged and composed of positive and negative lenses.

Another characteristic is that the second lens group $G_2$ linearly moves toward the object, while the third lens group $G_3$ linearly moves toward the image during variable power by zooming from the wide-angle end to the telephoto end.

The following Table 5 shows values of items in the embodiment 5. In Table 2 of the items in accordance with the embodiment, the symbol f is the focal distance, $F_{NO}$ is the F-number, and $2\omega$ is the field angle. Then, the numerals at the left end represent the order from the object side. The symbol r is the radius of curvature of the lens surface, d is the space dimension between the lens surfaces. The refractive index n and the Abbe's number are values with respect to a d-ray ($\lambda$=587.6 nm). D0 is a distance between an object and first surface of a lens.

TABLE 5

(Fifth Embodiment)

f = 102.5–292
$F_{NO}$ = 4.56–6.00
$2\omega$ = 23.2°–8.2°

| | r | d | υ | n |
|---|---|---|---|---|
| 1 | 170.667 | 2.00 | 44.7 | 1.80218 |
| 2 | 63.760 | 7.50 | 82.6 | 1.49782 |
| 3 | −394.822 | .20 | | |
| 4 | 60.429 | 7.20 | 82.6 | 1.49782 |
| 5 | 751.098 | (d5 = variable) | | |
| 6 | 78.889 | 2.00 | 31.6 | 1.75692 |
| 7 | 20.093 | .50 | | |

TABLE 5-continued (Fifth Embodiment)

f = 102.5–292
$F_{NO}$ = 4.56–6.00
2ω = 23.2°–8.2°

| | r | d | υ | n |
|---|---|---|---|---|
| 8 | 20.338 | 3.60 | 25.5 | 1.80458 |
| 9 | 41.659 | (d9 = variable) | | |
| 10 | −25.133 | 2.00 | 49.4 | 1.77279 |
| 11 | −33.520 | .70 | | |
| 12 | −24.944 | 2.30 | 25.5 | 1.80458 |
| 13 | −24.652 | (d13 = variable) | | |
| 14 | 59.084 | 2.50 | 23.0 | 1.86074 |
| 15 | 38.754 | 3.00 | | |
| 16 | −2587.516 | 4.00 | 69.9 | 1.51860 |
| 17 | −84.303 | .50 | | |
| 18 | 44.573 | 4.80 | 60.7 | 1.56384 |
| 19 | −36.479 | .50 | | |
| 20 | −33.320 | 1.50 | 32.2 | 1.67270 |
| 21 | −48.198 | (d21 = variable) | | |
| 22 | −132.405 | 2.50 | 25.5 | 1.80458 |
| 23 | −33.558 | .50 | | |
| 24 | −32.874 | 1.80 | 46.5 | 1.80411 |
| 25 | 46.284 | (d25 = variable) | | |

The variable space dimensions in variable power in the fifth embodiment are given as follows:

| F | 102.5004 | 200.0000 | 292.0000 |
|---|---|---|---|
| D0 | ∞ | ∞ | ∞ |
| d5 | 2.4471 | 29.8180 | 46.0605 |
| d9 | 20.5138 | 24.8355 | 27.4001 |
| d13 | 25.7976 | 9.6483 | 3.0073 |
| d21 | 27.7352 | 12.1918 | .0258 |
| d25 | 35.9784 | 64.7898 | 81.8871 |

The condition corresponding numerical values in the fifth embodiment are given as follows:

| (1) | $f_1/(fW \cdot fT)^{1/2}$ = 0.6589 |
|---|---|
| (2) | $f_2/f_3$ = 0.698 |
| (3) | $(DT_{2-3} - DW_{2-3})/fW$ = 0.06718 |
| (4) | $|f_{2-3}/fW|$ = 0.825951 |
| (5) | $f_4/|f_5|$ = 1.13998 |
| (6) | $f_1/|f_2|$ = 0.7862 |
| (7) | $|f_3|/fW$ = 2.025854 |
| (8) | TLT/fT = 0.71226 |
| (9) | βT3/βW3 = −0.7928 |
| (10) | $f_{2-3}/f_5$ = 2.016194 |
| (11) | N2−− N2+ = −0.04766 |
| (12) | υ2−− υ2+ = 6.124 |
| (14) | φ· $f_3$ = 1.802565 |
| (15) | υ3−− υ3+ = 23.953 |
| (17) | DW3-4/fW = 0.2517 |

Note that a moving ratio of the first lens group $G_1$ to the fifth lens group $G_5$ is 1 in the embodiments 1–5. Even if the moving ratio of the first lens group $G_1$ to the fifth lens group $G_5$ is not 1, however, a degree of freedom in terms of design increases enough to facilitate designing. Hence, this does not deviate from the requirements of the zoom lens according to the present invention.

As discussed above, according to the present invention, the whole zoom lens can be constructed of approximately 10–13 pieces of lenses. The compact telephoto zoom lens exhibiting a high image-forming performance is thereby attainable.

It is apparent that, in this invention, a wide range of different working modes can be formed based on the invention without deviating from the spirit and scope of the invention. This invention is not restricted by its specific working modes except being limited by the appended claims.

(B) Second Invention

The telephoto zoom lens according to the second invention, in each embodiment thereof, comprises, in succession from the object side, a first lens group G1 having positive refracting power, a second lens group G2 having negative refracting power, a third lens group G3 having negative refracting power, a fourth lens group G4 having positive refracting power, and a fifth lens group G5 having negative refracting power, and the lens groups move so that during variable power from the wide-angle end to the telephoto end, the space dimension between the first lens group G1 and the second lens group G2 increases, the space dimension between the second lens group G2 and the third lens group G3 linearly or non-linearly changes, and the space dimension between the fourth lens group G4 and the fifth lens group G5 decreases.

Each embodiment of the second invention will hereinafter be described with reference to the accompanying drawings.

EMBODIMENT 6

FIG. 7 shows the construction of a telephoto zoom lens according to a sixth embodiment of the present invention.

The shown telephoto zoom lens comprises, in succession from the object side, a first lens group G1 comprising a cemented lens comprising a negative meniscus lens having its convex surface facing the object side and a biconvex lens and a biconvex lens, a second lens group G2 comprising a cemented lens comprising a biconcave lens and a positive meniscus lens having its convex surface facing the object side, a third lens group G3 comprising a cemented lens comprising a biconcave lens and a biconvex lens, a fourth lens group G4 comprising a cemented lens comprising a biconvex lens and a negative meniscus lens having its concave surface facing the object side and a cemented lens comprising a biconvex lens and a negative meniscus lens having its concave surface facing the object side, and a fifth lens group G5 comprising a cemented lens comprising a biconvex lens and a biconcave lens.

An aperture stop S is provided between the third lens group G3 and the fourth lens group G4 and near the fourth lens group G4.

FIG. 7 shows the positional relations among the lens groups at the wide-angle end, and during variable power to the telephoto end, the lens groups move on the optical axis along zoom tracks indicated by arrows in the figure. However, the second lens group G2 is fixed during zooming.

The values of the items of Embodiment 6 of the present invention are given in Table 6 below. In Table 6, f represents the focal distance, $F_{NO}$ represents represents F-number, and 2ω represents the field angle. Further, the numbers at the left end represents the order of the lens surfaces from the object side, r represents the radius of curvature of each lens surface, d represents the space dimension between the lens surfaces, n represents the refractive index for a d-ray (λ=587.6 nm), and ν represents the Abbe's number for a d-ray (λ=587.6 nm). D0 represents the distance from the object to the first surface of the lens.

TABLE 6

$f = 76.5-292$
$F_{NO} = 4.62-5.77$
$2\omega = 32.56-8.2°$

| | r | d | ν | n |
|---|---|---|---|---|
| 1 | 2.80.061 | 2.00 | 4 0.9 | 1.79631 |
| 2 | 77.586 | 7.30 | 82.6 | 1.49782 |
| 3 | −428.023 | 0.20 | | |
| 4 | 87.627 | 6.50 | 70.0 | 1.51860 |
| 5 | −42 7.96 2 | (d5 = variable) | | |
| 6 | −142.978 | 1.70 | 45.9 | 1.54814 |
| 7 | 22.745 | 5.50 | 36.3 | 1.62004 |
| 8 | 104.648 | (d8 = variable) | | |
| 9 | −52.404 | 1.50 | 47.5 | 1.78797 |
| 10 | 56.961 | 3.60 | 33.7 | 1.64831 |
| 11 | −75.627 | (d11 = variable) | | |
| 12 | 152.9 34 | 3.8 0 | 4 8.0 | 1.71670 |
| 13 | −43.246 | 1.60 | 23.0 | 1.86074 |
| 14 | −83.641 | 0.50 | | |
| 15 | 71.466 | 4.50 | 57.0 | 1.62280 |
| 16 | −42.561 | 1.60 | 33.9 | 1.80384 |
| 17 | −150.924 | (d18 = variable) | | |
| 19 | 156.427 | 3.70 | 33.9 | 1.80388 |
| 20 | −36.315 | 1.50 | 49.5 | 1.77279 |
| 21 | 33.124 | (d21 = variable) | | |

(variable space dimensions in variable power)

| f | 76.5000 | 150.0000 | 292.0000 |
|---|---|---|---|
| D0 | ∞ | ∞ | ∞ |
| d5 | 2.0535 | 25.9285 | 61.4300 |
| d8 | 4.1342 | 20.1310 | 20.1277 |
| d11 | 5 5.3562 | 2 3.7 337 | 9.2402 |
| d18 | 30.1656 | 21.9163 | 0.9115 |
| d21 | 41.518 | 65.393 | 100.895 |

(condition corresponding values)

| (1) | $f1/(fW \cdot fT)^{1/2}$ = 0.9186 |
|---|---|
| (2) | $f2/f3 = 1.2851$ |
| (18) | $\beta W23 = -1.0637$ |
| (19) | $(DT23 - DW23)/fW = 0.2091$ |
| (5) | $f4/|f5| = 0.8067$ |
| (20) | $f1/|f2| = 0.9093$ |
| (7) | $|f3|/fW = 1.5360$ |
| (21) | $N3- = 1.78797$ |
| (22) | $\nu 3- = 47.5$ |
| (23) | $f(\beta 3 = -1)/fT = 0.632$ |
| (24) | $\beta W3 = -0.1592$ |

EMBODIMENT 7

Figure 8:
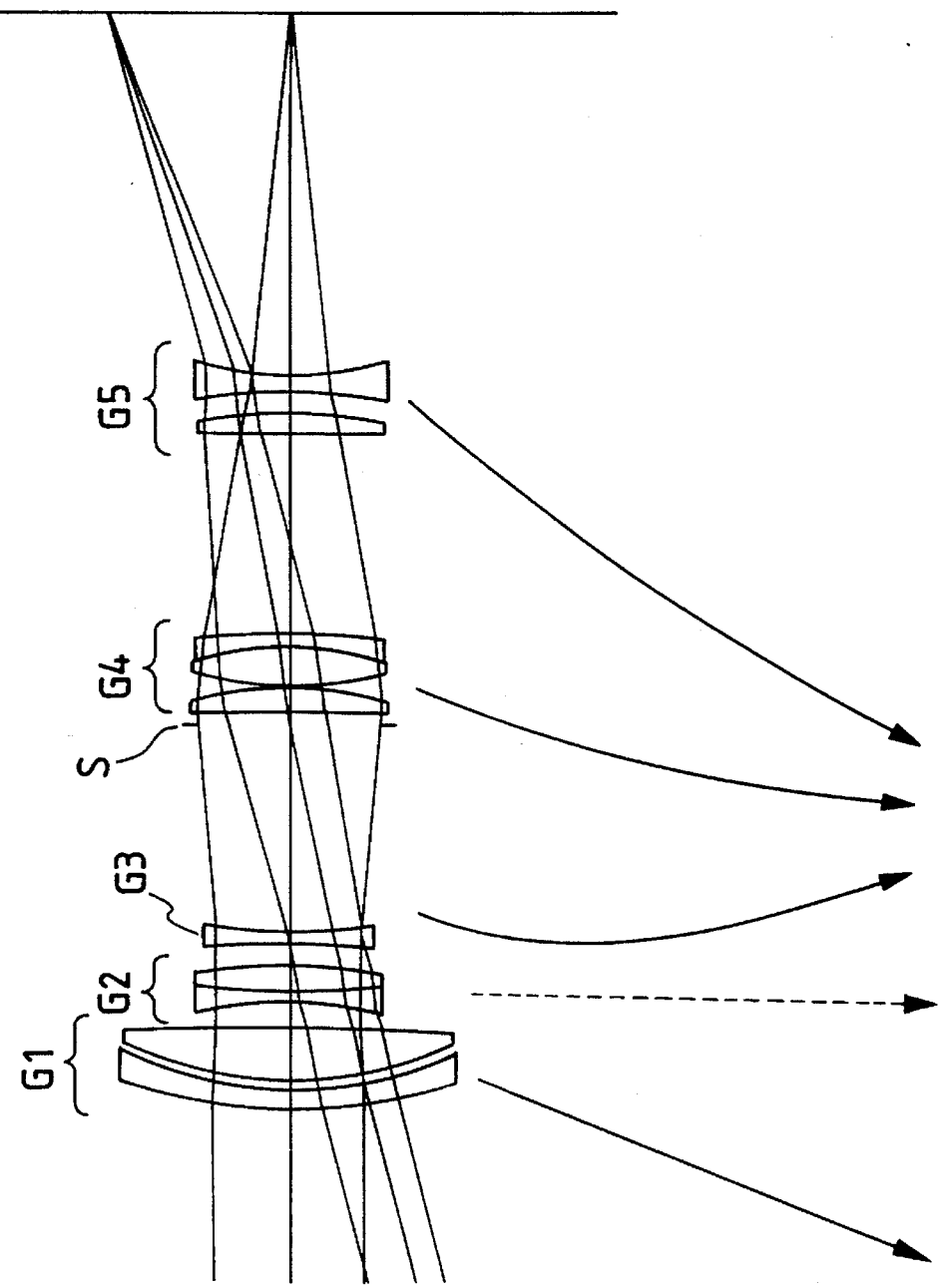
FIG. 8 shows the construction of a telephoto zoom lens according to a seventh embodiment of the present invention.

FIG. 8 shows the construction of a telephoto zoom lens according to a seventh embodiment of the present invention.

The shown telephoto zoom lens comprises, in succession from the object side, a first lens group G1 comprising a negative meniscus lens having its convex surface facing the object side and a biconvex lens, a second lens group G2 comprising a cemented lens comprising a biconcave lens and a biconvex lens, a third lens group $G_3$ comprising a biconcave lens, a fourth lens group $G_4$ comprising a negative meniscus lens having its concave surface facing the object side, and a cemented lens comprising a biconvex lens and a negative meniscus lens having its concave surface facing the object side, and a fifth lens group G5 comprising a biconvex lens and a biconcave lens.

An aperture stop S is provided between the third lens group G3 and the fourth lens group G4 and near the fourth lens group G4.

FIG. 8 shows the positional relations among the lens groups at the wide-angle end, and the lens groups suitably moves on the optical axis along zoom tracks during variable power to the telephoto end. However, the second lens group G2 is fixed during zooming.

The telephoto zoom lens of Embodiment 7 is of a construction similar to that of the above-described telephoto zoom lens of Embodiment 6, but differs in the refractive power and shape of each lens group.

The values of the items of Embodiment 7 of the present invention are given in Table 7 below. In Table 7, f represents the focal distance, $F_{NO}$ represents F-number, and 2 represents the field angle. Further, the numbers at the left end represent the order of the lens surfaces from the object side, r represents the radius of curvature of each lens surface, d represents the space dimension between the lens surfaces, n represents the refractive index for a d-ray ($\lambda=587.6$ nm), and ν represents the Abbe's number for a d-ray ($\lambda=587.6$ nm). D0 represents the distance from the object to the first surface of the lens.

TABLE 7

$f = 82-196$
$F_{NO} = 4.63-5.75$
$2\omega = 29.56-12.16°$

| | r | d | ν | n |
|---|---|---|---|---|
| 1 | 61.429 | 2.20 | 23.0 | 1.86074 |
| 2 | 42.428 | 1.20 | | |
| 3 | 44.796 | 6.00 | 60.6 | 1.60311 |
| 4 | −311.646 | (d4 = variable) | | |
| 5 | −44.015 | 1.40 | 49.5 | 1.77279 |
| 6 | 55.445 | 2.60 | 25.5 | 1.80458 |
| 7 | −76.695 | (d7 = variable) | | |
| 8 | −131.083 | 1.50 | 60.0 | 1.64000 |
| 9 | 79.320 | (d9 = variable) | | |
| 10 | −272.013 | 2.90 | 52.3 | 1.74810 |
| 11 | −39.905 | 0.20 | | |
| 12 | 48.340 | 4.40 | 64.1 | 1.51680 |
| 13 | −38.020 | 1.50 | 23.0 | 1.86074 |
| 14 | −120.242 | (d14 = variable) | | |
| 15 | 72.307 | 2.50 | 25.8 | 1.78472 |
| 16 | −52.636 | 2.40 | | |
| 17 | −60.000 | 1.50 | 47.5 | 1.78797 |
| 18 | 38.324 | (d18 = variable) | | |

(variable space dimensions in variable power)

| f | 82.0000 | 135.0000 | 196.0000 |
|---|---|---|---|
| D0 | ∞ | ∞ | ∞ |
| d4 | 2.8983 | 24.6958 | 40.8407 |
| d7 | 2.7314 | 1.8332 | 8.5372 |
| d9 | 25.6100 | 15.2492 | 3.5707 |
| d14 | 23.1544 | 12.6159 | 1.4454 |
| d18 | 42.8945 | 64.6920 | 80.8341 |

(condition corresponding values)

| (1) | $f1/(fW \cdot fT)^{1/2}$ = 0.8519 |
|---|---|
| (2) | $f2/f3 = 2.0130$ |
| (18) | $\beta W23 = -1.0052$ |
| (19) | $(DT23 - DW23)/fW = 0.09199$ |
| (5) | $f4/|f5| = 0.6855$ |
| (20) | $f1/|f2| = 0.6968$ |
| (7) | $|f3|/fW = 0.9390$ |
| (21) | $N3- = 1.64000$ |
| (22) | $\nu 3- = 60.0$ |
| (23) | $f(\beta 3 = -1)/fT = 0.746$ |
| (24) | $\beta W3 = -0.3266$ |

EMBODIMENT 8

Figure 9:
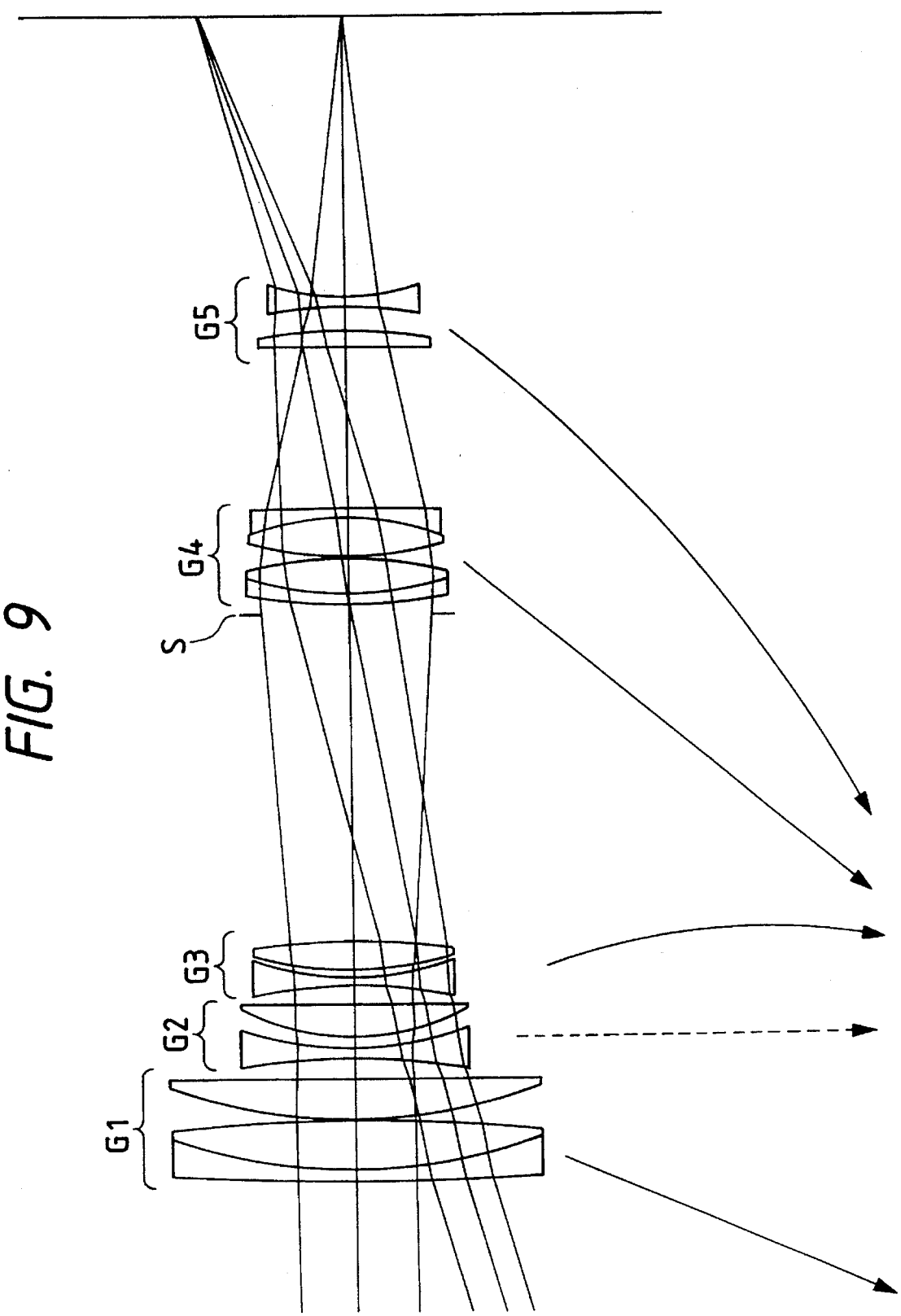
FIG. 9 shows the construction of a telephoto zoom lens according to an eighth embodiment of the present invention.

FIG. 9 shows the construction of a telephoto zoom lens according to an eighth embodiment of the present invention.

The shown telephoto zoom lens comprises, in succession from the object side, a first lens group G1 comprising a cemented lens comprising a negative meniscus lens having its convex surface facing the object side and a biconvex lens, and a biconvex lens, a second lens group G2 comprising a biconcave lens and a positive meniscus lens having its convex surface facing the object side, a third lens group G3 comprising a biconcave lens and a biconvex lens, a fourth lens group G4 comprising a cemented lens comprising a negative meniscus lens having its convex surface facing the object side and a biconvex lens, and a cemented lens comprising a biconvex lens and a negative meniscus lens having its concave surface facing the object side, and a fifth lens group G5 comprising a biconvex lens and a biconcave lens.

An aperture stop S is provided between the third lens group G3 and the fourth lens group G4 and near the fourth lens group G4.

FIG. 9 shows the positional relations among the lens groups at the wide-angle end, and the lens groups suitably move on the optical axis along zoom tracks during variable power to the telephoto end. However, the second lens group G2 is fixed during zooming.

The telephoto zoom lens of Embodiment 8 is of a construction similar to that of the above-described telephoto zoom lens of Embodiment 6, but differs in the refracting power and shape of each lens group.

The values of the items of Embodiment 8 of the present invention are given in Table 8 below. In Table 8, f represents the focal distance, $F_{NO}$ represent F-number, and $2\omega$ represents the field angle. Further, the numbers at the left end represent the order of the lens surfaces from the object side, r represents the radius of curvature of each lens surface, d represents the space dimension between the lens surfaces, n represents the refractive index for a d-ray ($\lambda$=587.6 nm), and $\nu$ represents the Abbe's number for a d-ray ($\lambda$=587.6 nm). D0 represents the distance from the object to the first surface of the lens.

TABLE 8 f = 76.5–292
$F_{NO}$ = 4.32–5.56
$2\omega$ = 32.6–8.1°

| | r | d | $\nu$ | n |
|---|---|---|---|---|
| 1 | 505.495 | 1.80 | 39.6 | 1.80454 |
| 2 | 88.945 | 7.20 | 82.5 | 1.49782 |
| 3 | −260.522 | 0.40 | | |
| 4 | 84.390 | 5.90 | 65.4 | 1.60300 |
| 5 | −2033.468 | (d5 = variable) | | |
| 6 | −117.357 | 1.70 | 45.9 | 1.77279 |
| 7 | 47.537 | 2.00 | | |
| 8 | 36.074 | 4.60 | 38.00 | 1.60342 |
| 9 | 1195.267 | (d9 = variable) | | |
| 10 | −71.597 | 1.50 | 43.4 | 1.84042 |
| 11 | 44.275 | 1.00 | | |
| 12 | 51.890 | 4.20 | 31.62 | 1.75692 |
| 13 | −123.012 | (d13 = variable) | | |
| 14 | 82.496 | 1.50 | 36.3 | 1.62004 |
| 15 | 48.373 | 5.40 | 70.0 | 1.51860 |
| 16 | −62.147 | 0.20 | | |
| 17 | 56.255 | 5.80 | 65.4 | 1.60300 |
| 18 | −40.874 | 1.40 | 33.90 | 1.80384 |
| 19 | −386.775 | (d19 = variable) | | |
| 20 | 2638.718 | 2.30 | 23.0 | 1.86074 |
| 21 | −89.450 | 3.80 | | |
| 22 | −84.533 | 1.50 | 49.5 | 1.77279 |
| 23 | 35.104 | (d23 = variable) | | |

(variable space dimensions in variable power)

| f | 76.5000 | 150.0000 | 292.0000 |
|---|---|---|---|
| D0 | ∞ | ∞ | ∞ |
| d5 | 2.7195 | 25.5358 | 58.8423 |
| d9 | 2.9937 | 13.2937 | 10.4787 |
| d13 | 50.8448 | 22.0377 | 2.3511 |
| d19 | 24.7594 | 17.8495 | 1.8495 |
| d23 | 42.3778 | 67.7948 | 105.7953 |

(condition corresponding values)

TABLE 8-continued

| (1) | f1/(fW · fT)$^{1/2}$ = 0.9033 |
|---|---|
| (2) | f2/f3 = 1.5455 |
| (18) | $\beta$W23 = −0.9950 |
| (19) | (DT23 − DW23)/fW = 0.09784 |
| (5) | f4/|f5| = 0.9333 |
| (20) | f1/|f2| = 0.7941 |
| (7) | |f3|/fW = 1.4379 |
| (21) | N3− = 1.84042 |
| (22) | $\nu$3− = 43.4 |
| (23) | f($\beta$3 = 0.747 |
| (24) | $\beta$W3 = −0.2037 |

In the above-described Embodiments 6 to 8, the second lens group G2 is fixed during variable power. However, where the second lens group G2 is not fixed, the degree of freedom in designing increases all the more and designing becomes easy. Accordingly, it is apparent that the present invention is also applicable to a telephoto zoom lens in which the second lens group G2 is not fixed.

As described above, according to the present invention, a zoom lens can be constructed of about ten to about thirteen lenses and there can be provided a telephoto zoom lens which is compact and high in variable power ratio as well as good in imaging performance. Particularly, a variable power ratio four times as high as that in the prior art is possible.

What is claimed is:

1. A telephoto zoom lens comprising, in order from the object side:

a first lens group having positive refracting power;

a second lens group having negative refracting power;

a third lens group having negative refracting power;

a fourth lens group having positive refracting power; and a fifth lens group having negative refracting power, wherein during variable power from a wide-angle end to a telephoto end, said lens groups move so that a space dimension between said first and second lens groups increases a space dimension between said second and third lens groups changes, and a space dimension between said fourth and fifth lens groups decreases, and wherein the following conditional expressions are satisfied:

$$0.3 \leq f_1/(fW \cdot fT)^{1/2} \leq 1.5$$

$$0.3 \leq f_2/f_3 \leq 5$$

$$0.01 \leq (DT_{2-3} - DW_{2-3})/fW \leq 0.6$$

where $f_1$ is the focal distance of said first lens group, $f_2$ is the focal distance of said second lens group, $f_3$ is the focal distance of said third lens group, $f_4$ is the focal distance of said fourth lens group, $f_5$ is the focal distance of said fifth lens group, fW is the focal distance of said whole zoom lens at the wide-angle end, $DW_{2-3}$ is the space dimension between said second and third lens groups at the wide-angle end, fT is the focal distance of said whole zoom lens at the telephoto end, and $DT_{2-3}$ is the space dimension between said second and third lens groups at the telephoto end.

2. The telephoto zoom lens according to claim 1, wherein the following conditions are satisfied:

$$0.5 < |f_{2-3}/fW| < 1$$
$$0.6 < f_4/|f_5| < 1.2$$
$$0.55 < f_1/|f_2| < 1$$
$$0.8 < |f_3|/fW < 2$$

where $f_{2-3}$: the synthetic focal distance of said second and third lens groups at the wide-angle end.

3. The telephoto zoom lens according to claim 2, wherein the following conditions are satisfied:

$$0.7 < TLT/fT < 0.85$$
$$-20 < \beta T3/\beta W3 < 10$$
$$0.7 < f_{2-3}/f_5 < 2.2$$

where
TLT: the total length at the wide-angle end,
fT: the focal distance at the wide-angle end,
βT3: the using magnification of said third lens group at the telephoto end;
βW3: the using magnification of said third lens group at the wide-angle end.

4. The telephoto zoom lens according to claim 3, wherein the following conditions are satisfied:

$$-0.3 < N2-- N2+ < 0$$
$$5 < v2-- v2+ < 20$$
$$-1 < q2 < 3$$

where q2 is the configurational factor of said second lens group q3 is the configurational factor of said third lens group N2−, v2− are the refractive index and the Abbe's number of negative lens elements of said second lens group and N2+, v2+ are the refractive index and the Abbe's number of positive lens elements of said second lens group.

5. The telephoto zoom lens according to claim 4, wherein the following conditions are satisfied:

$$0 < \phi \cdot f_3 < 2.0$$
$$5 < v3-- v3+ < 30$$
$$-15 < q3 < 0$$

where v3−, v3+ are the Abbe's numbers of negative and positive lenses constituting said third lens group, and φ is the refracting power of a joining surface of the negative and positive lenses constituting said third lens group or the refracting power of an air lens between the negative and positive lenses constituting said third lens group.

6. A telephoto zoom lens comprising, in order from the object side:

a first lens group having positive refracting power;

a second lens group having negative refracting power;

a third lens group having negative refracting power;

a fourth lens group having positive refracting power; and a fifth lens group having negative refracting power, wherein during variable power from a wide-angle end to a telephoto end, said lens groups move so that a space dimension between said first and second lens groups increases, a space dimension between said second and third lens groups changes linearly, and a space dimension between said fourth and fifth lens groups decreases, and wherein the following conditional expressions are satisfied:

$$0.3 \leq f_1/(fW \cdot fT)^{1/2} \leq 1.5$$
$$0.3 \leq f_2/f_3 \leq 5$$
$$0.01 \leq (DT_{2-3} - DW_{2-3})/fW \leq 0.6$$

where $f_1$ is the focal distance of said first lens group, $f_2$ is the focal distance of said second lens group, $f_3$ is the focal distance of said third lens group, $f_4$ is the focal distance of said fourth lens group, $f_5$ is the focal distance of said fifth lens group, fW is the focal distance of said whole zoom lens at the wide-angle end, $DW_{2-3}$ is the space dimension between said second and third lens groups at the wide-angle end, fT is the focal distance of said whole zoom lens at the telephoto end, and $DT_{2-3}$ is the space dimension between said second and third lens groups at the telephoto end.

7. A telephoto zoom lens comprising in order from the object side:

a first lens group having positive refracting power;

a second lens group having negative refracting power;

a third lens group having negative refracting power;

a fourth lens group having positive refracting power; and a fifth lens group having negative refracting power, wherein during variable power from a wide-angle end to a telephoto end, said lens groups move so that a space dimension between said first and second lens groups increases, a space dimension between said second and third lens groups changes nonlinearly, and a space dimension between said fourth and fifth lens groups decreases, and wherein the following conditional expressions are satisfied:

$$0.3 \leq f_1/(fW \cdot fT)^{1/2} \leq 1.5$$
$$0.3 \leq f_2/f_3 \leq 5$$
$$0.01 \leq (DT_{2-3} - DW_{2-3})/fW \leq 0.6$$

where $f_1$ is the focal distance of said first lens group, $f_2$ is the focal distance of said second lens group, $f_3$ is the focal distance of said third lens group, $f_4$ is the focal distance of said fourth lens group, $f_5$ is the focal distance of said fifth lens group, fW is the focal distance of said whole zoom lens at the wide-angle end, $DW_{2-3}$ is the space dimension between said second and third lens groups at the wide-angle end, fT is the focal distance of said whole zoom lens at the telephoto end, and $DT_{2-3}$ is the space dimension between said second and third lens groups at the telephoto end.

8. A telephoto zoom lens comprising, in order from the object side, a first lens group having positive refracting power, a second lens group having negative refracting power, a third lens group having negative refracting power, a fourth lens group having positive refracting power, and a fifth lens group having negative refracting power, wherein during variable power from a wide-angle end to a telephoto end, said lens groups move so that the space dimension between said first lens group and said second lens group increases, the space dimension between said second lens group and said third lens group changes, and the space dimension between said fourth lens group and said fifth lens group decreases, characterized in that the following conditions are satisfied:

$$0.3 \leq f1/(fW \cdot fT)^{1/2} \leq 1.5$$
$$0.3 \leq f2/f3 \leq 5$$
$$-1.5 < \beta W23 < -0.5$$

where f1 is the focal distance of said first lens group, f2 is the focal distance of said second lens group, f3 is the focal distance of said third lens group, fW is the focal distance of the whole zoom lens system at the wide-angle end, fT is the focal distance of the whole zoom lens system at the telephoto end, and βW23 is the composite used magnification of said second lens group and said third lens group at the wide-angle end.

9. A telephoto zoom lens according to claim 8, characterized in that the following condition is satisfied:

$$0.01 \leq (DT23-DW23)/fW \leq 0.6$$

where DT23 is the air gap along the optical axis between said second lens group and said third lens group at the wide-angle end, and DW23 is the air gap along the optical axis between said second lens group and said third lens group at the telephoto end.

10. A telephoto zoom lens according to claim 8, characterized in that the following conditions are satisfied:

$$0.6 < f4/|f5| < 1.2$$

$$0.55 < f1/|f2| < 1.2$$

where f4 is the focal distance of said fourth lens group, and f5 is the focal distance of said fifth lens group.

11. A telephoto zoom lens according to claim 9, characterized in that the following conditions are satisfied:

$$0.6<|f4/f5|<1.2$$

$$0.55<|f1/f2|<1.2$$

where f4 is the focal distance of said fourth lens group, and f5 is the focal distance of said fifth lens group.

12. A telephoto zoom lens according to claim 8, characterized in that the following condition is satisfied:

$$0.8<|f3|/fW<2.0.$$

13. A telephoto zoom lens according to claim 9, characterized in that the following condition is satisfied:

$$0.8<|f3|/fW<2.0.$$

14. A telephoto zoom lens according to claim 10, characterized in that the following condition is satisfied:

$$0.8<|f3|/fW<2.0.$$

15. A telephoto zoom lens according to claim 11, characterized in that the following condition is satisfied:

$$0.8<|f3|/fW<2.0.$$

16. A telephoto zoom lens according to claim 8, characterized in that the following conditions are satisfied:

$$1.72<N3-$$

$$40<v3-$$

where N3– is the refractive index of a concave lens in said third lens group which is most adjacent to the object side, and v3– is the Abbe's number of said concave lens.

17. A telephoto zoom lens according to claim 9, characterized in that the following condition is satisfied:

$$1.72<N3-$$

$$40<\mu4-$$

where N3– is the refractive index of a concave lens in said third lens group which is most adjacent to the object side, and v3" is the Abbe's number of said concave lens.

18. A telephoto zoom lens according to claim 10, characterized in that the following condition is satisfied:

$$1.72<N3-$$

$$40<\mu4-$$

where N3– is the refractive index of a concave lens in said third lens group which is most adjacent to the object side, and v3– is the Abbe's number of said concave lens.

19. A telephoto zoom lens according to claim 11, characterized in that the following condition is satisfied:

$$1.72<N3-$$

$$40<v3-$$

where N3– is the refractive index of a concave lens in said third lens group which is most adjacent to the object side, and v3– is the Abbe's number of said concave lens.

20. A telephoto zoom lens according to claim 12, characterized in that the following condition is satisfied:

$$1.72<N3-$$

$$40<\mu4-$$

where N3– is the refractive index of a concave lens in said third lens group which is most adjacent to the object side, and v3– is the Abbe's number of said concave lens.

21. A telephoto zoom lens according to claim 13, characterized in that the following condition is satisfied:

$$1.72<N3-$$

$$40<v3-$$

where N3– is the refractive index of a concave lens in said third lens group which is most adjacent to the object side, and v3– is the Abbe's number of said concave lens.

22. A telephoto zoom lens according to claim 14, characterized in that the following condition is satisfied:

$$1.72<N3-$$

$$40<v3-$$

where N3– is the refractive index of a concave lens in said third lens group which is most adjacent to the object side, and v3– is the Abbe's number of said concave lens.

23. A telephoto zoom lens according to claim 15, characterized in that the following condition is satisfied:

$$1.72<N3-$$

$$40<v3-$$

where N3– is the refractive index of a concave lens in said third lens group which is most adjacent to the object side, and v3– is the Abbe's number of said concave lens.

24. A telephoto zoom lens according to claim 8, characterized in that the following condition is satisfied:

$$0.25<f(\beta3=-1)/fT<1.0$$

where f($\beta3=-1$) is the focal distance of the whole zoom lens system when during variable power, the used magnification $\beta3$ of said third lens group is −1.

25. A telephoto zoom lens according to claim 9, characterized in that the following condition is satisfied:

$$0.25<f(\beta3=-1)/fT<1.0$$

where f($3=-1$) is the focal distance of the whole zoom lens system when during variable power, the used magnification $\beta3$ of said third lens group is −1.

26. A telephoto zoom lens according to claim 10, characterized in that the following condition is satisfied:

$$0.25<f(\beta3=-1)/fT<1.0$$

where f($\beta3=-1$) is the focal distance of the whole zoom lens system when during variable power, the used magnification $\beta3$ of said third lens group is −1.

27. A telephoto zoom lens according to claim 11, characterized in that the following condition is satisfied:

$$0.25<f(\beta3=-1)/fT<1.0$$

where f($\beta3=-1$) is the focal distance of the whole zoom lens system when during variable power, the used magnification $\beta3$ of said third lens group is −1.

28. A telephoto zoom lens according to claim 12, characterized in that the following condition is satisfied:

$$0.25<f(\beta3=-1)/fT<1.0$$

29. A telephoto zoom lens according to claim 13, characterized in that the following condition is satisfied:

$0.25 < f(\beta 3 = -1)/fT < 1.0$ where $f(\beta 3 = -1)$ is the focal distance of the whole zoom lens system when during variable power, the used magnification $\beta 3$ of said third lens group is $-1$.

30. A telephoto zoom lens according to claim 14, characterized in that the following condition is satisfied:

$0.25 < f(\beta 3 = -1)/fT < 1.0$ where $f(\beta 3 = -1)$ is the focal distance of the whole zoom lens system when during variable power, the used magnification $\beta 3$ of said third lens group is $-1$.

31. A telephoto zoom lens according to claim 15, characterized in that the following condition is satisfied:

$0.25 < f(\beta 3 = -1)/fT < 1.0$ where $f(\beta 3 = -1)$ is the focal distance of the whole zoom lens system when during variable power, the used magnification $\beta 3$ of said third lens group is $-1$.

32. A telephoto zoom lens according to claim 16, characterized in that the following condition is satisfied:

$0.25 < f(\beta 3 = -1)/fT < 1.0$ where $f(\beta 3 = -1)$ is the focal distance of the whole zoom lens system when during variable power, the used magnification $\beta 3$ of said third lens group is $-1$.

33. A telephoto zoom lens according to claim 17, characterized in that the following condition is satisfied:

$0.25 < f(\beta 3 = -1)/fT < 1.0$ where $f(\beta 3 = -1)$ is the focal distance of the whole zoom lens system when during variable power, the used magnification $\beta 3$ of said third lens group is $-1$.

34. A telephoto zoom lens according to claim 18, characterized in that the following condition is satisfied:

$0.25 < f(\beta = -1)/fT < 1.0$ where $f(\beta = -1)$ is the focal distance of the whole zoom lens system when during variable power, the used magnification $\beta 3$ of said third lens group is $-1$.

35. A telephoto zoom lens according to claim 19, characterized in that the following condition is satisfied:

$0.25 < f(\beta 3 = -1)/fT < 1.0$ where $f(\beta 3 = -1)$ is the focal distance of the whole zoom lens system when during variable power, the used magnification $\beta 3$ of said third lens group is $-1$.

36. A telephoto zoom lens according to claim 20, characterized in that the following condition is satisfied:

$0.25 < f(\beta 3 = -1)/fT < 1.0$ where $f(\beta 3 = -1)$ is the focal distance of the whole zoom lens system when during variable power, the used magnification $\beta 3$ of said third lens group is $-1$.

37. A telephoto zoom lens according to claim 21, characterized in that the following condition is satisfied:

$0.25 < f(\beta 3 = -1)/fT < 1.0$ where $f(\beta 3 = -1)$ is the focal distance of the whole zoom lens system when during variable power, the used magnification $\beta 3$ of said third lens group is $-1$.

38. A telephoto zoom lens according to claim 22, characterized in that the following condition is satisfied:

$0.25 < f(\beta 3 = -1)/fT < 1.0$ where $f(\beta 3 = -1)$ is the focal distance of the whole zoom lens system when during variable power, the used magnification $\beta 3$ of said third lens group is $-1$ 39. A telephoto zoom lens according to claim 23, characterized in that the following condition is satisfied:

$0.25 < f(\beta 3 = -1)/fT < 1.0$ where $f(\beta 3 = -1)$ is the focal distance of the whole zoom lens system when during variable power, the used magnification $\beta 3$ of said third lens group is $-1$.

40. A telephoto zoom lens according to claim 8, characterized in that the used magnification $\beta W3$ of said third lens group at the wide-angle end satisfies the following condition:

$-0.5 < \beta W3 < -0.1$.

41. A telephoto zoom lens according to claim 9, characterized in that the used magnification $\beta W3$ of said third lens group at the wide-angle end satisfies the following condition:

$-0.5 < \beta W3 < -0.1$.

42. A telephoto zoom lens according to claim 10, characterized in that the used magnification $\beta W3$ of said third lens group at the wide-angle end satisfies the following condition:

$-0.5 < \beta W3 < -0.1$.

43. A telephoto zoom lens according to claim 11, characterized in that the used magnification $\beta W3$ of said third lens group at the wide-angle end satisfies the following condition:

$-0.5 < \beta W3 < -0.1$.

44. A telephoto zoom lens according to claim 12, characterized in that the used magnification $\beta W3$ of said third lens group at the wide-angle end satisfies the following condition:

$-0.5 < \beta W3 < -0.1$.

45. A telephoto zoom lens according to claim 13, characterized in that the used magnification $\beta W3$ of said third lens group at the wide-angle end satisfies the following condition:

$-0.5 < \beta W3 < -0.1$.

46. A telephoto zoom lens according to claim 14, characterized in that the used magnification $\beta W3$ of said third lens group at the wide-angle end satisfies the following condition:

$-0.5 < \beta W3 < -0.1$.

47. A telephoto zoom lens according to claim 15, characterized in that the used magnification $\beta W3$ of said third lens group at the wide-angle end satisfies the following condition:

−0.5<βW3<0.1.

48. A telephoto zoom lens according to claim 16, characterized in that the used magnification βW3 of said third lens group at the wide-angle end satisfies the following condition:

−0.5<βW3<−0.1.

49. A telephoto zoom lens according to claim 17, characterized in that the used magnification βW3 of said third lens group at the wide-angle end satisfies the following condition:

−0.5<βW3<−0.1.

50. A telephoto zoom lens according to claim 18, characterized in that the used magnification βW3 of said third lens group at the wide-angle end satisfies the following condition:

−0.5<βW3<−0.1.

51. A telephoto zoom lens according to claim 19, characterized in that the used magnification βW3 of said third lens group at the wide-angle end satisfies the following condition:

−0.5<W3<−0.1.

52. A telephoto zoom lens according to claim 20, characterized in that the used magnification βW3 of said third lens group at the wide-angle end satisfies the following condition:

−0.5<W3<−0.1.

53. A telephoto zoom lens according to claim 21, characterized in that the used magnification βW3 of said third lens group at the wide-angle end satisfies the following condition:

−0.5<βW3<−0.1.

54. A telephoto zoom lens according to claim 22, characterized in that the used magnification βW3 of said third lens group at the wide-angle end satisfies the following condition:

−0.5<βW3<−0.1.

55. A telephoto zoom lens according to claim 23, characterized in that the used magnification βW3 of said third lens group at the wide-angle end satisfies the following condition:

−0.5<βW3<−0.1.

56. A telephoto zoom lens according to claim 24, characterized in that the used magnification βW3 of said third lens group at the wide-angle end satisfies the following condition:

−0.5<βW3<−0.1.

57. A telephoto zoom lens according to claim 25, characterized in that the used magnification βW3 of said third lens group at the wide-angle end satisfies the following condition:

−0.5<βW3<−0.1.

58. A telephoto zoom lens according to claim 26, characterized in that the used magnification βW3 of said third lens group at the wide-angle end satisfies the following condition:

−0.5<βW3<−0.1.

59. A telephoto zoom lens according to claim 27, characterized in that the used magnification βW3 of said third lens group at the wide-angle end satisfies the following condition:

−0.5<βW3<−0.1.

60. A telephoto zoom lens according to claim 28, characterized in that the used magnification βW3 of said third lens group at the wide-angle end satisfies the following condition:

−0.5<βW3<−0.1.

61. A telephoto zoom lens according to claim 29, characterized in that the used magnification βW3 of said third lens group at the wide-angle end satisfies the following condition:

−0.5<βW3<−0.1.

62. A telephoto zoom lens according to claim 30, characterized in that the used magnification βW3 of said third lens group at the wide-angle end satisfies the following condition:

−0.5<βW3<−0.1.

63. A telephoto zoom lens according to claim 31, characterized in that the used magnification βW3 of said third lens group at the wide-angle end satisfies the following condition:

−0.5<βW3<−0.1.

64. A telephoto zoom lens according to claim 32, characterized in that the used magnification βW3 of said third lens group at the wide-angle end satisfies the following condition:

−0.5<βW3<−0.1.

65. A telephoto zoom lens according to claim 33, characterized in that the used magnification βW3 of said third lens group at the wide-angle end satisfies the following condition:

−0.5<βW3<−0.1.

66. A telephoto zoom lens according to claim 34, characterized in that the used magnification βW3 of said third lens group at the wide-angle end satisfies the following condition:

−0.5<βW3<−0.1.

67. A telephoto zoom lens according to claim 35, characterized in that the used magnification βW3 of said third lens group at the wide-angle end satisfies the following condition:

−0.5<βW3<−0.1.

68. A telephoto zoom lens according to claim 36, characterized in that the used magnification βW3 of said third lens group at the wide-angle end satisfies the following condition:

$-0.5 < \beta W3 < -0.1$.

69. A telephoto zoom lens according to claim 37, characterized in that the used magnification $\beta W3$ of said third lens group at the wide-angle end satisfies the following condition:

$-0.5 < \beta W3 < -0.1$.

70. A telephoto zoom lens according to claim 38, characterized in that the used magnification $\beta W3$ of said third lens group at the wide-angle end satisfies the following condition:

$-0.5 < \beta W3 < -0.1$.

71. A telephoto zoom lens according to claim 39, characterized in that the used magnification $\beta W3$ of said third lens group at the wide-angle end satisfies the following condition:

$-0.5 < \beta W3 < -0.1$.

* * * * *